United States Patent
Ye et al.

(10) Patent No.: US 12,237,928 B2
(45) Date of Patent: *Feb. 25, 2025

(54) SIDELINK RESOURCE SENSING USING FEEDBACK CHANNELS

(71) Applicant: InterDigital Patent Holdings, Inc., Wilmington, DE (US)

(72) Inventors: Chunxuan Ye, San Diego, CA (US); Fengjun Xi, San Diego, CA (US); Kyle Jung-Lin Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,285

(22) Filed: Jan. 16, 2024

(65) Prior Publication Data

US 2024/0163025 A1 May 16, 2024

Related U.S. Application Data

(63) Continuation of application No. 17/421,499, filed as application No. PCT/US2020/012858 on Jan. 9, 2020, now Pat. No. 11,916,680.

(Continued)

(51) Int. Cl.
*H04L 1/1825* (2023.01)
*H04L 1/1607* (2023.01)
*H04W 72/04* (2023.01)

(52) U.S. Cl.
CPC .......... *H04L 1/1825* (2013.01); *H04L 1/1607* (2013.01); *H04W 72/04* (2013.01)

(58) Field of Classification Search
CPC ....... H04W 72/02; H04W 4/40; H04W 76/14; H04W 92/18; H04L 5/0033; H04L 1/1819;

(Continued)

(56) References Cited

U.S. PATENT DOCUMENTS

2014/0112406 A1   4/2014   Zhu et al.
2020/0112982 A1*  4/2020   Li ......................... H04W 72/23
(Continued)

FOREIGN PATENT DOCUMENTS

CN   103493391 A    1/2014
WO   2019197025 A1  10/2019

OTHER PUBLICATIONS

3rd Generation Partnership Project (3GPP), R2-1816897, "HARQ Procedure for Mode 1", CATT, 3GPP TSG-RAN WG2 Meeting #104 Spokane, USA, Nov. 12-16, 2018, 5 pages.

(Continued)

*Primary Examiner* — Rushil P. Sampat
(74) *Attorney, Agent, or Firm* — Condo Roccia Koptiw LLP

(57) ABSTRACT

A WTRU may select sidelink unicast or groupcast to transmit data. If the WTRU selects sidelink unicast, the WTRU may select to use HARQ ACK/NACK feedback for the transmission. If the WTRU selects sidelink groupcast, either HARQ NACK or HARQ ACK/NACK may be selected depending upon one or more factors. The WTRU may select HARQ NACK or HARQ ACK/NACK depending upon one or more of: a number of WTRUs to receive the data; a condition of a channel associated with transmission; or a quality of service associated with transmission. The WTRU may select a first or second PSFCH format for feedback based upon one or more factors. The WTRU may select a first or second PSFCH format based upon one or more of: the selected sidelink unicast or groupcast; the selected HARQ NACK or HARQ ACK/NACK feedback; or a quality of service associated with the transmission.

18 Claims, 15 Drawing Sheets

Related U.S. Application Data

(60) Provisional application No. 62/790,139, filed on Jan. 9, 2019.

(58) Field of Classification Search
CPC ... H04L 1/1854; H04L 1/1861; H04L 1/1887; H04L 1/1896; H04L 5/0055; H04L 5/0064; H04L 5/0094; H04L 1/0041; H04L 1/0045; H04L 5/0026
See application file for complete search history.

(56) References Cited

U.S. PATENT DOCUMENTS

| | | | |
|---|---|---|---|
| 2020/0275412 A1* | 8/2020 | Kim | H04B 7/06954 |
| 2020/0305176 A1 | 9/2020 | Hu et al. | |
| 2021/0044964 A1* | 2/2021 | Lindheimer | H04W 8/26 |
| 2021/0136731 A1* | 5/2021 | Li | H04W 28/0278 |
| 2021/0329597 A1 | 10/2021 | Kwak et al. | |
| 2022/0159623 A1 | 5/2022 | Seo et al. | |

OTHER PUBLICATIONS

3rd Generation Partnership Project (3GPP), R1-1814265, "Updated Feature Lead Summary for Agenda Item 7.2.4.1.2 Physical Layer Procedures", LG Electronics, 3GPP TSG RAN WG1 Meeting #95 Spokane, USA, Nov. 12-16, 2018, 12 pages.

R1-1812205, , "Sidelink physical layer procedures for NR V2X", 3GPP TSG RAN WG1 Meeting #95; Huawei, HiSilicon; Spokane, USA, Nov. 12-16, 2018, 12 pages.

R1-1812879, , "Discussion on HARQ Feedback and CSI Acquisition for Sidelink", CMCC, 3GPP TSG RAN WG1 Meeting #95, Spokane, USA, Nov. 12-16, 2018, 5 pages.

R1-1813976, , "Discussion on NR V2X HARQ Mechanism", ITL, 3GPP TSG RAN WG1 Meeting #95, Spokane, USA, Nov. 12-16, 2018, pp. 1-4.

R2-1817578, , "Considerations for Groupcast in NR V2X", Kyocera, 3GPP TSG-RAN WG2 #104, Spokane, USA, Nov. 12-16, 2018, 3 pages.

TR 22.886 V0.2.0, , "3rd Generation Partnership Project (3GPP)", Technical Specification Group Services and System Aspects, Study on Enhancement of 3GPP Support for 5G V2X Services (Release 15), Aug. 2016, pp. 1-46.

TS 22.186 V15.2.0, , "3rd Generation Partnership Project (3GPP)", Technical Specification Group Services and System Aspects, Enhancement of 3GPP Support for V2X Scenarios, Stage 1 (Release 15), Sep. 2017, pp. 1-16.

TS 36.212 V15.0.1, , "3rd Generation Partnership Project (3GPP)", Technical Specification Group Radio Access Network, Evolved Universal Terrestrial Radio Access (E-UTRA), Multiplexing and Channel Coding (Release 15), Jan. 2018, pp. 1-214.

R1-1905405, "On Physical Layer Procedures for NR V2X Sidelink", InterDigital, Inc., 3GPP TSG RAN WG1 #96b, Xi'an, China, Apr. 8-12, 2019, 9 pages.

R1-1907096, "On Physical Layer Procedures for NR V2X Sidelink", InterDigital, Inc., 3GPP TSG RAN WG1 #97, Reno, USA, May 13-17, 2019, 9 pages.

R1-1900794, "Physical Layer Procedures for Nr V2X Sidelink ", InterDigital, Inc., 3GPP TSG RAN WG1 Ad-Hoc Meeting 1901, Taipei, Taiwan, Jan. 21-25, 2019, 10 pages.

R1-1909032, "Physical Layer Procedures for NR V2X Sidelink", InterDigital, Inc., 3GPP TSG RAN WG1 #98, Pargue, CZ, Aug. 26-30, 2019, 12 pages.

R1-1902596, "Discussion on Physical Layer Procedures for NR V2X Sidelink", InterDigital, Inc., 3GPP TSG RAN WG1 #96, Athens, Greece, Feb. 25-Mar. 1, 2019, 9 pages.

* cited by examiner

SIDELINK RESOURCE SENSING USING FEEDBACK CHANNELS

CROSS-REFERENCE TO RELATED APPLICATIONS

This application is a continuation of U.S. Ser. No. 17/421,499 (now U.S. Pat. No. 11,916,680) which is the National Stage entry under 35 U.S.C. § 371 of Patent Cooperation Treaty Application PCT/US2020/012858, filed Jan. 9, 2020, which claims the benefit of U.S. Provisional Ser. No. 62/790,139, filed Jan. 9, 2019, the contents of each of which are hereby incorporated by reference herein in their entireties.

BACKGROUND

Wireless communication devices may establish communications with other devices and data networks via various access networks. For example, a wireless communication device may establish communications via a 3GPP radio access network (RAN) and/or 5G, e.g., New Radio (NR), RAN. A wireless communication device may access a RAN to communication with other wireless devices and to access data networks communicatively coupled with a RAN.

Wireless communication devices may establish direct communications with other wireless communication devices. For example, a wireless communication device may communicate with another wireless communication device without the communications traversing a RAN. Such direct device-to-device communication may be referred to as sidelink communication.

SUMMARY

Disclosed herein are systems and implementations for providing feedback for sidelink communications. A computing system, which may be, for example, a wireless transmit and receive unit (WTRU) may be programmed to determine that data is to be transmitted via a sidelink transmission and may determine the type of feedback that may be used in connection with the sidelink transmission.

The WTRU may select sidelink unicast transmission or sidelink groupcast transmission to transmit the data. If the WTRU selects sidelink unicast to transmit the data, the WTRU may select HARQ ACK/NACK feedback to be used for feedback associated with transmission of the data.

If the WTRU selects sidelink groupcast transmission to transmit the data, either HARQ NACK feedback or HARQ ACK/NACK feedback may be selected for feedback based upon one or more factors or conditions. The WTRU may select HARQ NACK feedback or HARQ ACK/NACK feedback for use with transmission of the data based upon, or on a condition sidelink groupcast being selected to transmit the data, and one or more of a number of WTRUs to receive the data, a condition of a channel associated with transmitting the data, or a quality of service associated with transmitting the data. The WTRU may select HARQ NACK feedback based upon, or on a condition one or more of the number of WTRUs to receive the data being larger than a threshold, the channel associated with transmitting the data having a high load, or the quality of service associated with transmitting the data being non-high reliability or non-latency-critical. The WTRU may select HARQ ACK/NACK feedback based upon, or on a condition one or more of the number of WTRUs to receive the data being less than a threshold, the channel associated with transmitting the data having a low load, or the quality of service associated with transmitting the data being high reliability or latency-critical.

The WTRU may select a first PSFCH format or a second PSFCH format for providing feedback based upon one or more factors or conditions. The first PSFCH format may be, for example, PSFCH format 0, and the second PSFCH format may be, for example, PSFCH format 1. The WTRU may select a first PSFCH format or a second PSFCH format based upon, or on a condition one or more of the selected sidelink unicast or sidelink groupcast, the selected HARQ NACK feedback or HARQ ACK/NACK feedback, or a quality of service associated with transmitting the data. The WTRU may select the first PSFCH format based upon or on a condition sidelink unicast being selected, HARQ ACK NACK feedback being selected, and the quality of service associated with transmitting the data not being high reliability. The WTRU may select the second PSFCH format based upon, or on a condition sidelink unicast being selected, HARQ ACK NACK feedback being selected, and the quality of service associated with transmitting the data being high reliability. The WTRU may select the first PSFCH format based upon, or on a condition sidelink groupcast being selected and HARQ NACK being selected. The WTRU may select the first PSFCH format based upon, or on a condition sidelink groupcast being selected, HARQ ACK NACK feedback being selected, and the quality of service associated with transmitting the data not being high reliability. The WTRU may select the first PSFCH format based upon, or on a condition sidelink groupcast being selected, HARQ ACK NACK feedback being selected, and the quality of service associated with transmitting the data not being high reliability and not having a large minimum communication range. The WTRU may select the second PSFCH format based upon, or on a condition sidelink groupcast being selected, HARQ ACK NACK feedback being selected, and the quality of service associated with transmitting the data being high reliability. The WTRU may select the second PSFCH format based upon, or on a condition sidelink groupcast being selected, HARQ ACK NACK feedback being selected, and the quality of service associated with transmitting the data being high reliability and having a large minimum communication range.

The WTRU may transmit the data using the selected sidelink unicast or sidelink groupcast. The WTRU may also transmit information indicating the selected first PSFCH format or second PSFCH format and information indicating a selected HARQ NACK or HARQ ACK/NACK feedback. The WTRU may subsequently receive feedback regarding the sidelink communication using the selected HARQ NACK or HARQ ACK/NACK and the selected first PSFCH format or second PSFCH format.

This Summary is provided to introduce a selection of concepts in a simplified form. The concepts are further described herein in the Detailed Description. This Summary is not intended to limit the scope of the claimed subject matter. Other features are described herein.

BRIEF DESCRIPTION OF THE DRAWINGS

A more detailed understanding may be had from the following description, given by way of example in conjunction with the accompanying drawings wherein.

DETAILED DESCRIPTION

Techniques are described for selecting feedback formats to be used with sidelink communications. A WTRU may select to transmit data using sidelink unicast transmission or sidelink groupcast transmission. Depending upon which transmission type is selected and one or more additional factors, the WTRU may select to use either HARQ ACK/NACK or HARQ NACK feedback in connection with transmitting the data. The WTRU may also select to use either PSFCH format 0 or PSFCH format 1 for feedback depending upon whether unicast or groupcast communication is used as well as one or more additional factors.

Figure 1A:
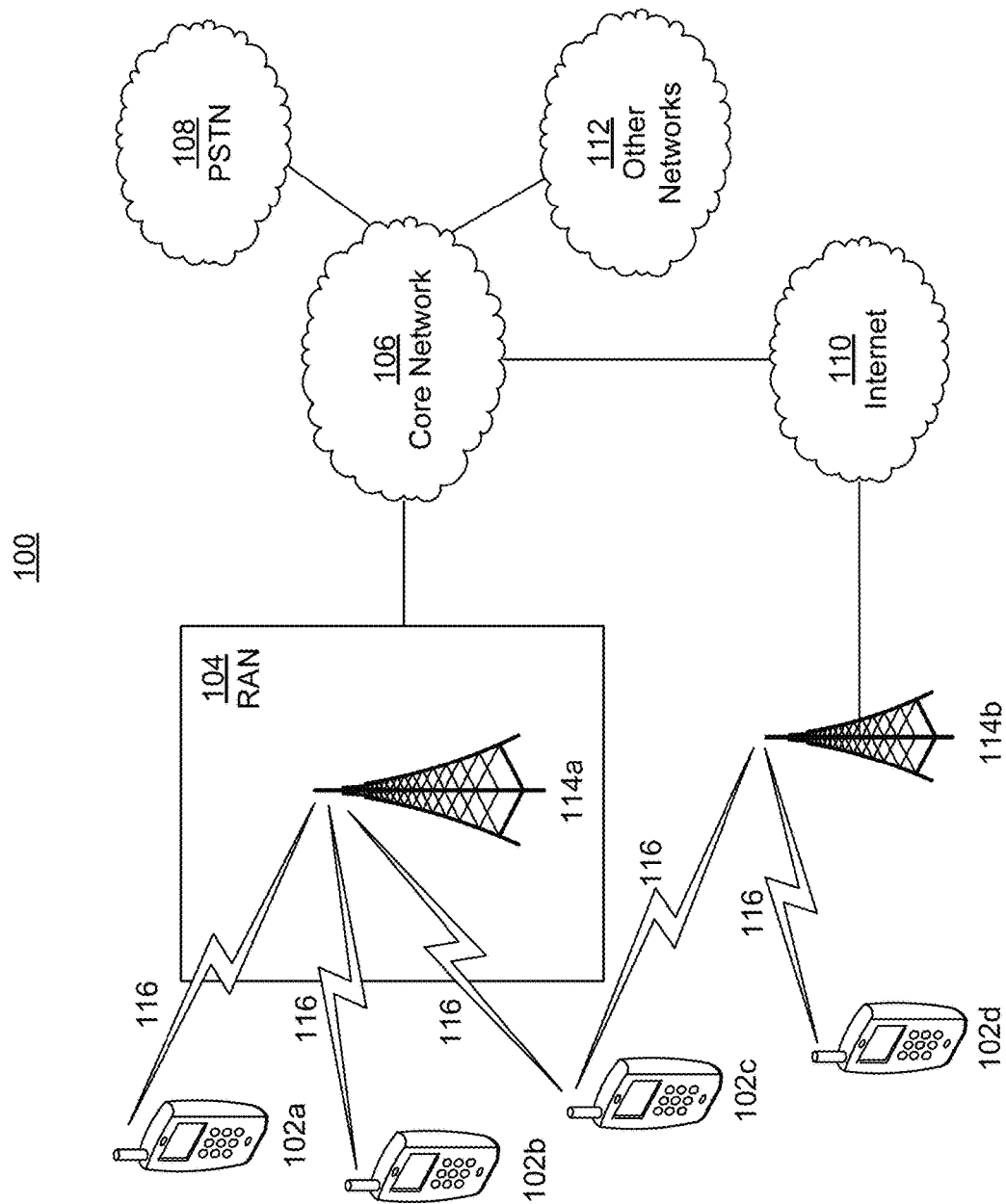
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
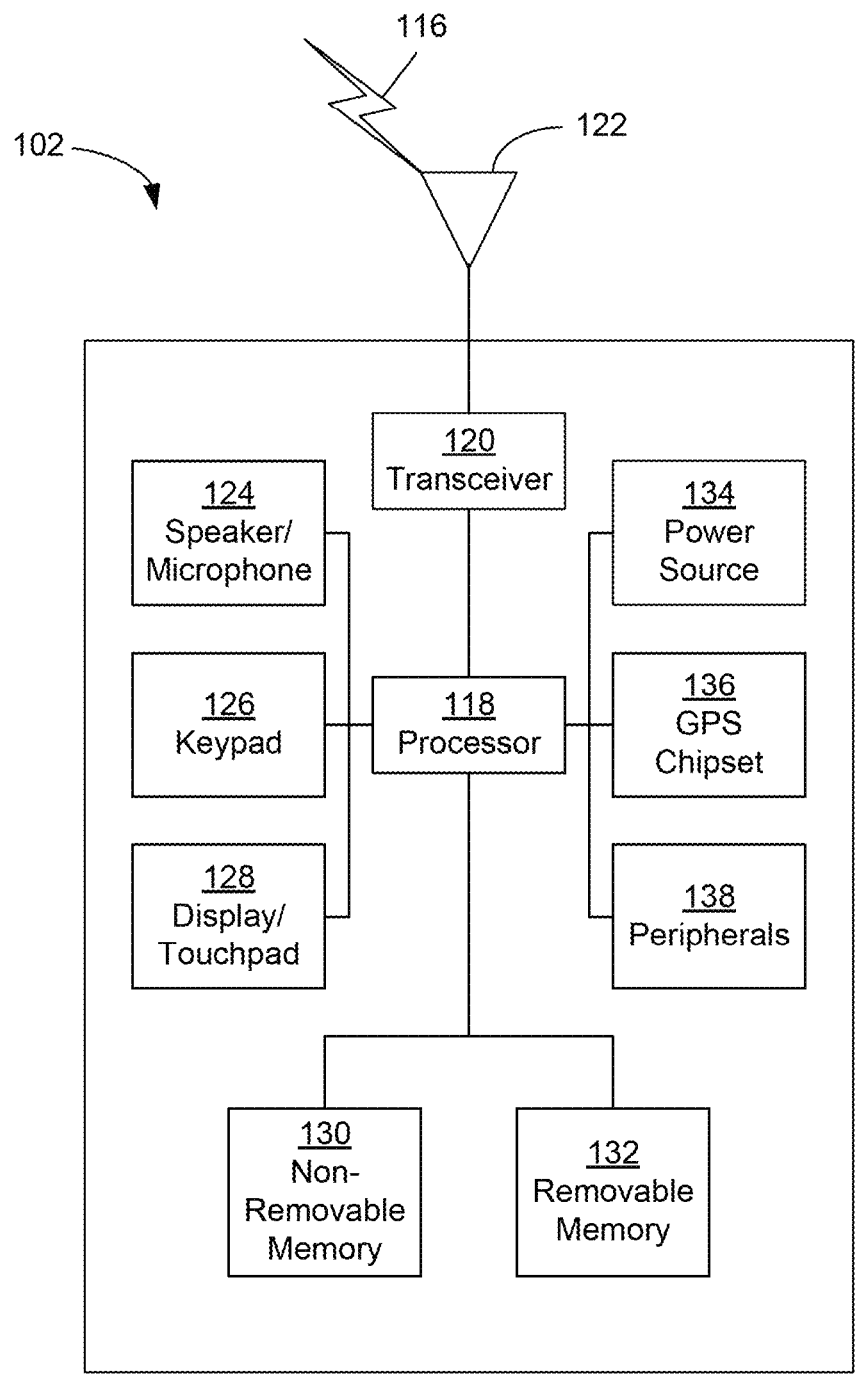
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
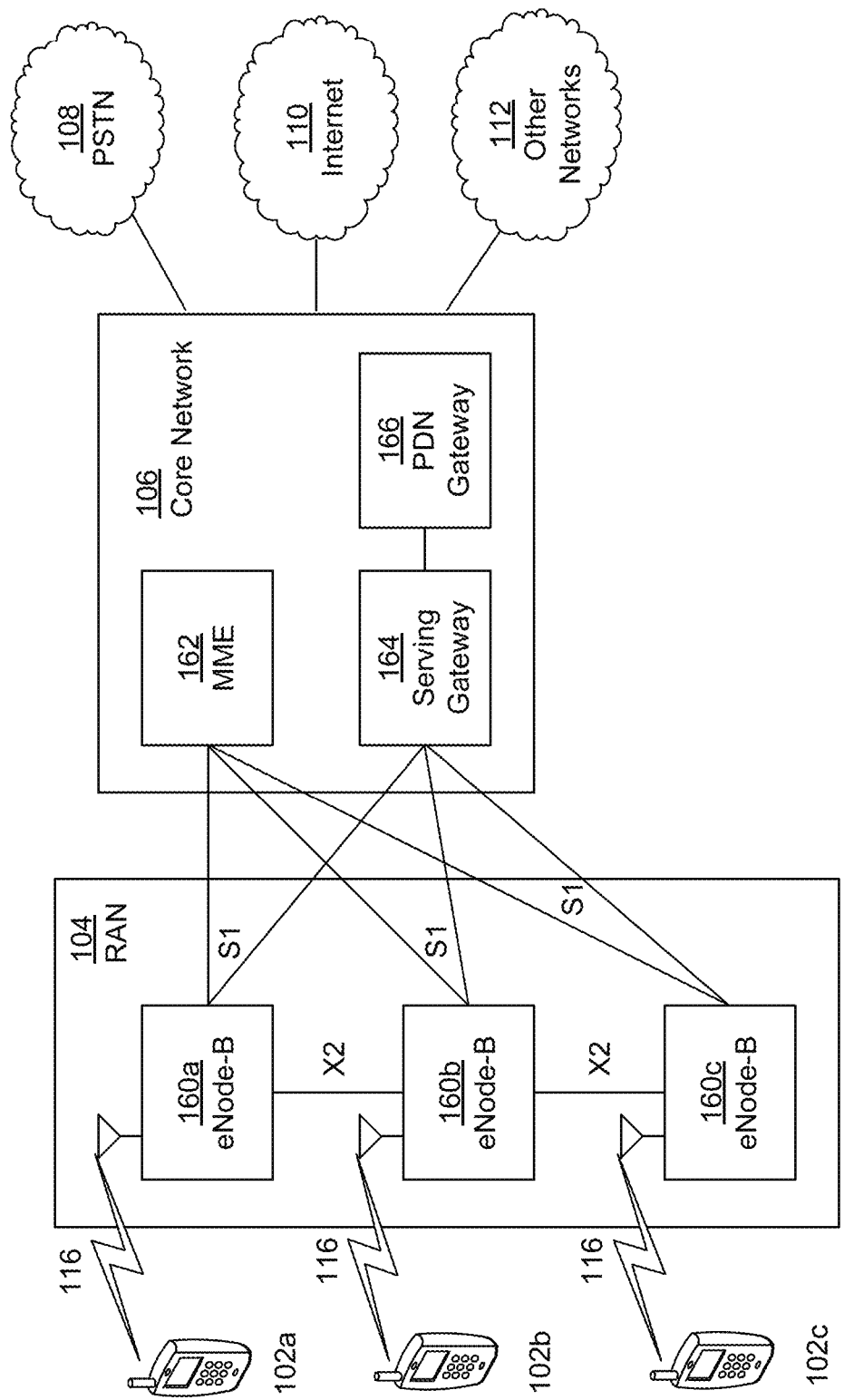
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
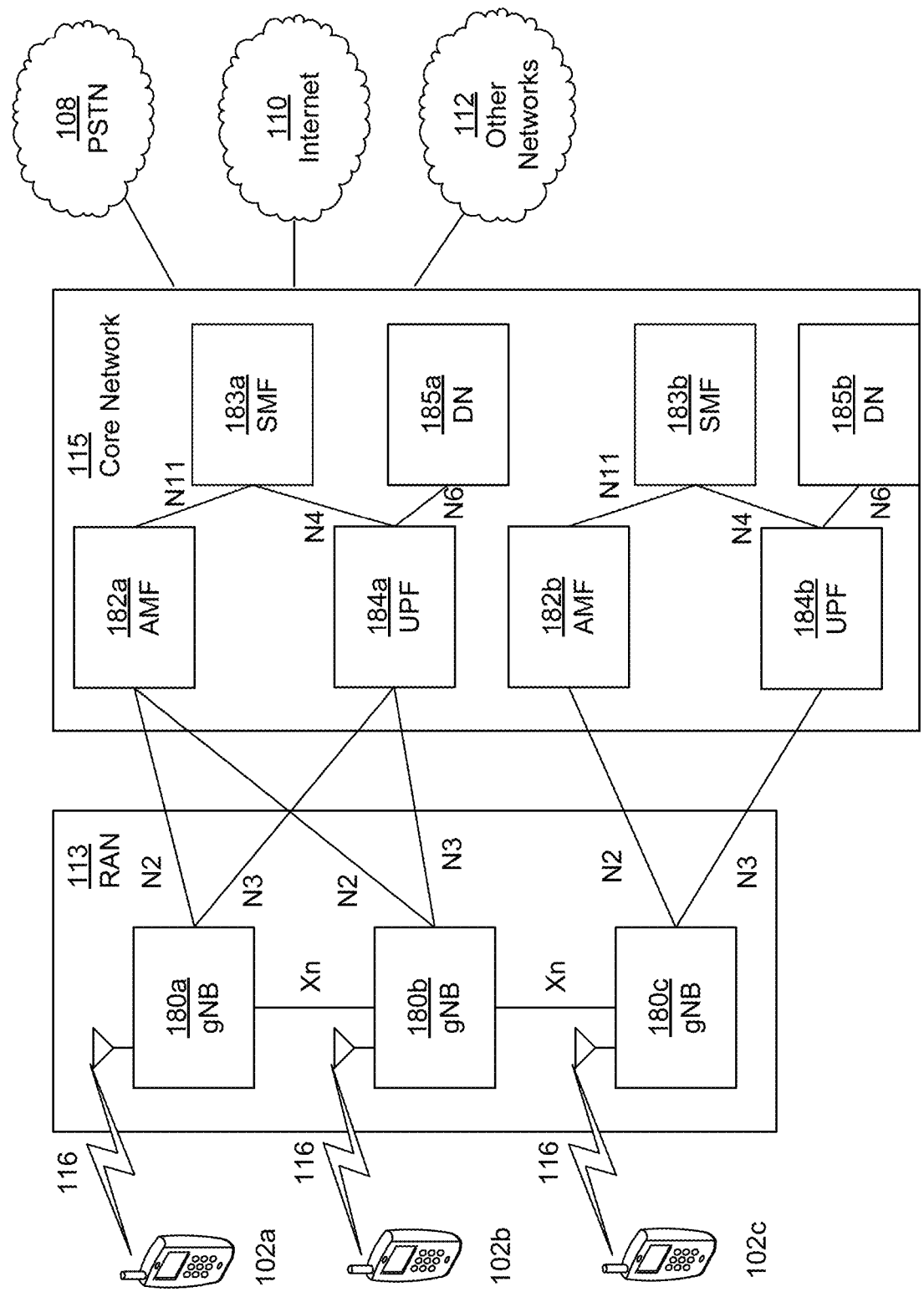
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (ills) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Techniques are described for selecting feedback formats to be used with sidelink communications. A WTRU may select sidelink unicast transmission or sidelink groupcast transmission to transmit data. If the WTRU selects sidelink unicast to transmit the data, the WTRU may select HARQ ACK/NACK feedback to be used for feedback associated with transmission of the data. If the WTRU selects sidelink groupcast transmission to transmit the data, either HARQ NACK feedback or HARQ ACK/NACK feedback may be selected for feedback depending upon one or more additional factors or conditions. The WTRU may select HARQ NACK feedback or HARQ ACK/NACK feedback for use with transmission of the data depending upon one or more of: a number of WTRUs to receive the data; a condition of a channel associated with transmitting the data; or a quality of service associated with transmitting the data. The WTRU may select a first PSFCH format or a second PSFCH format for providing feedback in connection with transmitting the data based upon one or more factors or conditions. The WTRU may select a first PSFCH format or a second PSFCH format based upon one or more of: the selected sidelink unicast or sidelink groupcast; the selected HARQ NACK feedback or HARQ ACK/NACK feedback; or a quality of service associated with transmitting the data.

In connection with wireless communications, e.g., 3GPP, several deployment scenarios may be defined, e.g., indoor hotspot, dense urban, rural, urban macro, high speed, etc. On top of these deployment scenarios, three example use cases may be defined: Enhanced Mobile Broadband (eMBB), Massive Machine Type Communications (mMTC) and Ultra Reliable and Low latency Communications (URLLC). Different use cases may focus on different requirements such as, for example, higher data rate, higher spectrum efficiency, low power and higher energy efficiency, lower latency and higher reliability.

Wireless communications provide for performing Vehicular-to-Everything (V2X) techniques. Using V2X techniques, one or more of the following example operations may be performed: vehicle platooning, sensor and state map sharing, remote driving, or automated cooperative driving.

Vehicle platooning may include operating a group of vehicles in a closely linked manner so that the vehicles move like a train (e.g., with virtual strings attached between vehicles). To maintain vehicle distance, for example, the vehicles may share status information among themselves. By using platooning, the distances between vehicles may be reduced and the number of drivers may be reduced. Platooning may lower the overall fuel consumption.

In V2X communications, vehicle blockage may occur. Vehicle blockage may result in the reduction of the signal strength, for example, for high carrier frequencies such as, for example, frequencies above 6 GHz. Vehicle blockage may be treated as a separate state, beyond line-of-sight state and non-line-of-sight state.

A V2X transmission mode may be selected. In LTE V2X, a vehicle may be in, for example, transmission mode 3 (e.g., mode 3 user) or transmission mode 4 (e.g., mode 4 user). A mode 3 user may use the resources allocated by a base station for sidelink (SL) communication among vehicles or between vehicle and a pedestrian. A mode 4 user may obtain a list of candidate resources allocated by a base station and may select a resource among the candidate resources for the mode 4 user's SL communication.

In NR V2X, the mode 1 user may be similar to the mode 3 user in LTE V2X and a mode 2 user may include the mode 4 user in LTE V2X.

A "user" or "WTRU" may include a vehicle (e.g., user). V2X control information may be transmitted or received. A downlink control information (DCI) format 5A may be used. The DCI format 5A may be used for the scheduling of Physical Shared Control Channel (PSCCH), and one or more sidelink control information (SCI) format 1 fields may be used for the scheduling of PSSCH. The payload of DCI format 5A may include one or more of the following: a carrier indicator, which may include one or more (e.g., 3) bits; a lowest index, e.g., of the subchannel allocation to an initial transmission, which may include one or more (e.g., $\lceil \log_2(N_{subchannel}^{SL}) \rceil$) bits; SCI format 1 fields, a frequency resource location, for example, of an initial transmission and retransmission; a time gap between initial transmission and retransmission; a SL index, which may include one or more (e.g., 2) bits (e.g., this field may be present for cases with time division duplex (TDD) operation with uplink-downlink configuration 0-6). When a format 5A cyclic redundancy check (CRC) may be scrambled with a SL Semi-Persistent-Scheduling Vehicle RNTI SL-SPS-V-RNTI, one or more of the following fields may be present: a SL semi-persistent-scheduling (SL SPS) configuration index, which may include one or more (e.g., 3) bits; 2), or an activation/release indication, which may include one or more (e.g., 1) bits.

If the number of information bits in format 5A mapped onto a given search space is less than the payload size of format 0 mapped onto the same search space, zeros may be appended or padded to format 5A until the payload size (e.g., which equals that of format 0 including any padding bits appended to format 0).

If the format 5A CRC is scrambled by SL-V-RNTI and if the number of information bits in format 5A mapped onto a given search space is less than the payload size of format 5A with CRC scrambled by SL-SPS-V-RNTI mapped onto the same search space and format 0 is not defined on the same search space, zeros may be appended to format 5A until the payload size equals that of format 5A with CRC scrambled by SL-SPS-V-RNTI.

In V2X implementations, SCI format 1 may be used. A SCI format 1 may be used for the scheduling of PSSCH. The payload of SCI format 1 may include one or more of the following: a priority, which may include one or more (e.g., 3) bits; a resource reservation, which may include one or more (e.g., 4) bits; a frequency resource location, for example, of an initial transmission and retransmission, which may include one or more (e.g., $\lceil \log_2(N_{subchannel}^{SL} (NN_{subchannel}^{SL}+1)/2) \rceil$) bits; a time gap, for example, between an initial transmission and a retransmission, which may include one or more (e.g., 4) bits; a modulation and coding scheme, which may include one or more (e.g., 5) bits; or a retransmission index, which may include one or more (e.g., 1) bits. Reserved information bits may be added, for example, until the size of SCI format 1 is equal to 32 bits. The reserved bits may be set to zero.

V2X Mode 4 WTRU resource selection may be performed. The resource selection for a mode 4 WTRU (e.g., in LTE) may include one or more of the following. A transmission window between [$n+T_1$, $n+T_2$] may be determined, for example, by selecting proper $T_1$ and $T_2$ values based on latency requirements. A candidate resource may be denoted by $R_{x,y}$ and the set of candidate resources may be denoted by S. The set of candidate resources may be determined by sensing sidelink Received Signal Strength Indication (RSSI). The total number of candidate resources may be referred to as $M_{total}$. A set $S_A$ from S may be determined, for example, based on the RSRP level of candidate resources. If a candidate resource in S has RSRP level above a certain threshold, the candidate resource may be saved to $S_A$. A resource $R_{x,y}$ may be removed from the candidate resource set $S_A$, for example, if the resource conflicts with its own transmissions or other WTRU reserved resources (e.g., mode 3 reserved resources). If the number of remaining candidate resources in $S_A$ (e.g., after removing conflicting resources) is no more than $0.2*M_{total}$, then the set of candidate resources may be determined by sensing sidelink RSSI with a smaller threshold. If the number of remaining candidate resources in $S_A$ (e.g., after removing conflicting resources) is more than $0.2*M_{total}$, a set $S_A$ of resources may be ranked based on its RSSI values averaged over the past several slots. The first $0.2*M_{total}$ ranked resources (e.g., $S_B$) of lowest RSSI values may be reported to higher layers for a final resource selection.

A physical uplink control channel (PUCCH) format may be selected and/or used. Uplink control information (UCI) may include HARQ-ACK, scheduling resource (SR), and channel state information (CSI) feedback. The UCI may be delivered, for example, via PUCCH. One or more (e.g., 5) PUCCH formats may be defined. One or more of the following may apply. PUCCH format 0 and format 1 may be used to convey 1-2 bits payload, while PUCCH formats 2, 3, 4 may be used to convey more than 2 bits payload. PUCCH format 0 and format 2 may occupy 1 or 2 symbols, while PUCCH formats 1, 3, 4 may occupy 4-14 symbols. PUCCH format 0 and format 2 may include (e.g., may be referred to as) a short PUCCH. PUCCH formats 1, 3, 4 may include (e.g., may be referred to as) a long PUCCH. PUCCH formats 0, 1, 4 may occupy 1 physical resource block (PRB) and PUCCH formats 2 and 3 may occupy 1-16 PRBs.

PUCCH format 0 may be based on 12 base sequences, e.g., with different cyclic shift values. In PUCCH format 0, the payload information may be used to select base sequences. Two (2) sequences may be used by a user for a payload of 1 bit, and 4 sequences may be used by a user for a payload of 2 bits. User multiplexing may be supported, for example, to share the total of 12 base sequences.

PUCCH format 1 may be based on a sequence modulation. A time domain Orthogonal Cover Code (OCC) may be applied to spread sequence modulated symbols (e.g., to achieve user multiplexing). The OCC sequences length may depend on the number of symbols of PUCCH format 1. The OCC sequence length may be equal to the number of OCC sequences (e.g., or the number of users for multiplexing). Among the 4-14 symbols, for example, the demodulated reference signal (DMRS) may occur in every other symbol.

PUCCH format 2 may be based on a cyclic prefix orthogonal frequency-division multiplexing (CP-OFDM) waveform. The payload with CRC may be encoded using, for example, a reed-muller (RM) or polar code. The encoded bits may be scrambled with a gold sequence, e.g., before quadrature phase-shift keying (QPSK) modulation. The modulation symbols and DMRS may be FDM multiplexed (e.g., where DMRS occupies the 1, 4, 7, 10 subcarriers of each PRB).

PUCCH formats 3 and 4 may be based on DFT-S-OFDM waveform.

The PUCCH resource sets, PUCCH resource, and PUCCH formats parameters may be configured, (e.g., in system information block 1 (SIB1)) for common configuration, and may be configured by, e.g., a "PUCCH-Config" information element (IE), for dedicated configuration.

Feedback techniques for V2X sidelink unicast and/or groupcast may be performed. In V2X (e.g., LTE V2X), sidelink communications may be broadcast and feedback may not be performed. In V2X examples (e.g., NR V2X), the sidelink may be unicast or groupcast, and feedback may be performed, for example, to provide more reliable transmissions and/or achieve higher spectral efficiency for a given channel condition. The feedback may include HARQ-ACK information, CQI, MIMO-related parameters (e.g., PMI, RI, CRI), etc.

In V2X examples (e.g., NR V2X), a Physical Sidelink feedback Channel (PSFCH) may be defined. The PSFCH may be supported to convey Sidelink Feedback Control Information (SFCI) for unicast and/or groupcast via PSFCH.

PSFCH formats and implementations may be designed. The PSFCH formats may be aligned between a transmitting (Tx) WTRU and receiving (Rx) WTRU. The PSFCH formats may be known to other WTRUs (e.g., mode 2 WTRUS) to facilitate their resource selection for PSFCH. The PSFCH formats (e.g., and PSFCH formats parameters) may be determined and signaled. For groupcast sidelink, a sharing mechanism of the feedback resources among the group members may be considered together with the PSFCH formats determination.

The SFCI may be delivered on PSFCH and on PSSCH. SFCI piggybacking on PSFCH may be performed.

Resource allocation for mode 1 WTRU retransmissions for V2X sidelink (e.g., unicast or groupcast) may be performed. Sidelink unicast or groupcast may support HARQ feedback, which may trigger retransmissions on the sidelink unicast or groupcast. The resource for retransmissions may be allocated, for example, by gNB. The Tx WTRU may request a retransmission resource based on a Rx WTRU's feedback and other factors. The Rx WTRU may send the HARQ feedback to a gNB, which may trigger a retransmission resource allocation.

A gNB may schedule sidelink communications (e.g., in LTE). A gNB may schedule LTE sidelink transmissions which may be useful in certain deployment areas covered by gNB signals. A gNB configured to schedule sidelink transmissions may be useful when LTE eNB are removed due to, for example the coverage of gNB.

In URLLC (e.g., NR enhanced URLLC), compact DCI may be employed. Compact DCI may restrict the payload size of DCI 1_0 and 0_0, for example, such that about a 24-bit payload size may be used for compact DCI. The payload size of LTE DCI 5A format may be compacted (e.g., so that the new NR DCI format has a similar size as the compact DCI), which may reduce the blind detection efforts. A compact format of LTE DCI 5A may be designed.

A PSFCH structure may be provided. A subset of the PUCCH formats may be re-used for the PSFCH formats. A Tx WTRU may determine PSFCH formats/resources and indicate the PSFCH formats/resources (e.g., in SCI). For example, a Tx WTRU may indicate one or more of the following (e.g., in SCI): PSFCH format(s) and/or their associated parameters; PSFCH format usage associated with SL traffic type (e.g., unicast or groupcast); a (e.g., direct indication of) PSSCH-to-HARQ_feedback slot offset; or (e.g., a selection of) a "HARQ-NACK" scheme or a "HARQ-ACK/NACK" scheme (e.g., for groupcast SL).

A PSFCH structure and/or usage may be provided where one or more of the following may apply. A subset of PUCCH formats may be reused for PSFCH formats. A Tx WTRU may determine (e.g., dynamically determine) PSFCH formats/resources and/or provide an indication in SCI. A PFSCH format 0 design may be provided and/or used. A PFSCH format 1 design may be provided and/or used. A PSFCH format 2 design may be provided and/or used.

A subset of PUCCH formats may be used (e.g., re-used) for PSFCH formats. The payload of PSFCH formats may include HARQ-ACK, CSI, and/or Reference Signal Received Power/Reference Signal Received Quality (RSRP/RSRQ). The HARQ-ACK bits may be non-code block group (non-CBG) based (e.g., where 1 or 2 HARQ-ACK feedback bits may be supported). The HARQ-ACK bits may be CBG-based (e.g., where the number of HARQ-ACK feedback bits may be more than 2). The CSI may include, for example, CQI/PMI/RI. In examples, SR may not be included in PSFCH (e.g., unlike NR PUCCH).

The payload of PSFCH may include 1-2 bits for HARQ-ACK. The payload of PSFCH may include more than 2 bits for CSI or RSRP/RSRQ (e.g., with or without HARQ-ACK). The waveform of SL control and data channels may be (e.g., may only be) CP-OFDM. The waveform of SL control and data channels may also be DFT-s-OFDM. PUCCH formats 3 and 4 may not be suitable for PSFCH formats.

A subset of the PUCCH formats may be used (e.g., re-used) for PSFCH formats. PSFCH format 0 may be defined in a manner similar to PUCCH format 0. PSFCH format 1 may be defined in a manner similar to PUCCH format 1. PSFCH format 2 may be defined in a manner similar to PUCCH format 2. PSFCH format 0, 1, 2 may be defined similar to PUCCH format 0, 1, 2, respectively.

PSFCH format 0 may be defined in a manner similar to PUCCH format 0. PSFCH format 1 may be defined in a manner similar to PUCCH format 2. When PSFCH format 0 and 1 are defined (e.g., only PSFCH format 0 and 1 are defined), PSFCH format 0 and 1 may be defined similar to PUCCH format 0 and 2, respectively.

A Tx WTRU may determine (e.g., dynamically determine) PSFCH formats/resources. A TX WTRU may indicate the PSFCH formats/resources, for example, in SCI.

A device (e.g., gNB) may apply RRC messages, for example, to configure one or more (e.g., up to 4) PUCCH resource sets. The resource sets (e.g., each resource set) may include one or more (e.g., several) PUCCH resources. The PUCCH resources (e.g., each PUCCH resource) may be associated with a PUCCH format, for example, where the frequency-domain (F-domain) and time-domain (T-domain) (e.g., within a slot) resource elements (REs) may be specified in the resource configuration.

A device (e.g., gNB) may indicate one or more of the following to a WTRU: the time slot the WTRU may use to send the PUCCH (e.g., where such an indication may be via a DCI field, such as, "PDSCH-to-HARQ_feedback timing indicator"); or the PUCCH resource the WTRU may use to send the PUCCH (e.g., where such an indication may be via a DCI field, such as, "PUCCH resource indicator").

A WTRU may determine a resource set to use, for example, based on the UCI payload size. The WTRU may determine a resource within the resource set, for example, based on DCI.

In V2X SL (e.g., NR V2X SL), the RRC configuration between a Tx WTRU and Rx WTRU may not be suitable, may not be used, etc. One or more of the following may apply. The RRC configuration may not meet the latency requirements of the V2X sidelink data. The RRC configuration may not be known to other WTRUs (e.g., other mode 2 WTRUs). Other WTRUs (e.g., the other mode 2 WTRUs) may collect the PSFCH information via sensing implementations and may schedule their own transmissions, which may involve reserving one or more PSFCH resources.

A Tx WTRU may use SCI to indicate to (e.g., dynamically inform) a Rx WTRU about feedback information. The feedback information may include one or more of the following: a PSFCH enabling or disabling indicator; the PSFCH formats and their associated parameters; a PSSCH-to-HARQ_feedback timing indicator; or an indication of the option of "HARQ-NACK" scheme or the option of "HARQ-ACK/NACK" scheme (e.g., for groupcast SL).

One or more of the following may apply for using SCI to indicate PSFCH formats and/or the associated parameters. The PSFCH format to be used may be provided, e.g., PSFCH format 0, 1 or 2. The starting PRB (e.g., or subchannel) of the PSFCH resource may be provided. If PSFCH format 2 is used, the number of PRBs may be provided. The starting symbol index and number of symbols within a slot may be provided. An indication of whether intra-slot frequency hopping is supported may be provided. If intra-slot frequency hopping is supported, the starting PRB (e.g., or sub-channel) of a hop (e.g., the second hop) may be provided. The PSFCH format usage may be associated with SL traffic type (e.g., unicast or groupcast). For SL groupcast, PSFCH format 0 or 1 (e.g., only PSFCH forma 0 or 1) may be used, if the CSI or RSRP/RSRQ feedback is not transmitted and CBG case is not supported. For SL unicast, PSFCH formats 0 and 2 of (e.g., only PSFCH formats 0 and 2), or PSFCH formats 1 and 2 (e.g., only PSFCH formats 1 and 2) may be used.

A PDSCH-to-HARQ_feedback timing indicator may be provided using SCI. One or more of the following may apply. The PDSCH-to-HARQ_feedback timing indicator (e.g., a 3-bit PDSCH-to-HARQ_feedback timing indicator field in DCI) may be equal to an item index of the "dl-DataToUL-ACK" table. The "dl-Data-ToUL-ACK" table may be configured, for example, via an RRC message in the "PUCCH-Config" IE. A slot offset value may be used to send HARQ-ACK feedback (e.g., from a slot of the receiving PDCCH). A slot offset (e.g., a maximum slot offset) may include 15 slots. An indication (e.g., a direct indication) of the PSSCH-to-HARQ_feedback slot offset may be provided. In V2X SI (e.g., NR V2X SI), the values in the "PSSCH-to-HARQ_feedback timing indicator" may indicate (e.g., directly indicate) a slot offset value of the HARQ feedback from a PSSCH reception (e.g., instead of relying on RRC parameters to determine the actual slot offset). The indication (e.g., the direct indication) may provide other WTRUs (e.g., other mode 2 WTRUs) with the timing offsets (e.g., by SCI decoding in the other WTRUs sensing implementation). This facilitates avoiding collision on the PSFCH (or HARQ) resources.

A 3-bit field may be provided and one or more of the following may apply: "000" may indicate that the offset is equal to 0, e.g., the same slot is used for HARQ feedback; "001" may indicate an offset of 1 slot; "010" may indicate an offset of 2 slots; "011" may indicate an offset of 3 slots; "100" may indicate an offset of 4 slots; "101" may indicate an offset of 5 slots; "110" may indicate an offset of 6 slots; or "111" may indicate an offset of 7 slots. Similar techniques may be extended to 4-bit fields.

Feedback information provided using SCI may include an indication of the "HARQ-NACK" scheme or the "HARQ-ACK/NACK" scheme (e.g., for groupcast sidelink). One or more of the following may apply. The "HARQ-NACK" scheme may be used if the number of receiver WTRUs is large. The "HARQ-ACK/NACK" scheme may be used when the number of receiver WTRUs may be small and the PSFCH resource may be shared by the receiver WTRUs. A Tx WTRU may select the schemes between the "HARQ-NACK" scheme or the "HARQ-ACK/NACK" scheme and indicate the feedback operations to a Rx WTRU. If the "HARQ-ACK/NACK" scheme is selected, an indication (e.g., SCI indication) of whether an additional criterion in deciding HARQ-ACK/NACK transmission may be provided (e.g., by a Tx WTRU). A Rx WTRU may stop transmitting an ACK bit if the Rx WTRU previously sent the ACK for the same TB. A Rx WTRU may keep transmitting an ACK bit each time the Rx WTRU receives a PSSCH and the Rx WTRU's transmission TB has already been decoded (e.g., no matter whether the TB was decoded in a previous (re)transmission or is decoded in the current (re)transmission).

If a PSFCH resources/formats indication is included in SCI, the PSFCH resources/formats may be broadcast to one or more WTRUs (e.g., all WTRUs, so that untargeted WTRUs do not use reserved PSFCH resources). If a two-stage (e.g., or two-part) SCI scheme is used, the PSFCH resources/formats indication may be included in part 1 of SCI (e.g., together with other PSCCH/PSSCH resource indications). Part 1 of SCI may be broadcast to WTRUs (e.g., all WTRUs), for example, without RNTI based scrambling.

A PSFCH format 0 design may be provided. An initial cyclic shift value may be included in SCI. CDM sharing may be performed. An initial cyclic shift value may depend on a WTRU ID. FDM sharing may be performed. The location of PRBs may depend on WTRU ID. A PSFCH format 0 for HARQ-NACK scheme in sidelink groupcast may be provided.

A PFSCH format 0 design may be provided. An indication (e.g., a dynamic indication) of an initial cyclic shift value may be provided. One or more of the following may apply. PUCCH format 0 may support user multiplexing on the same PUCCH resource (e.g., in NR). One or more (e.g., 12 sequences) may be used for PUCCH format 0. If a WTRU (e.g., each WTRU) sends a single bit of HARQ-ACK/NACK feedback, the WTRU may utilize two (2) sequences, and the resource may be shared by one or more WTRUs (e.g., 6 WTRUs). If a WTRU (e.g., each WTRU) sends two bits of HARQ-ACK/NACK feedback, the WTRU may utilize 4 sequences and the resource may be shared by one or more WTRUs (e.g., 3 WTRUs). A WTRU (e.g., each WTRU) may use a different initial cyclic shift value. The initial cyclic shift value may be signaled, for example, via RRC configuration, and may be associated with the PUCCH resource.

The initial cyclic shift value for PSFCH format 0 may be indicated (e.g., dynamically indicated), which may not depend on the PSFCH resource.

A PSFCH format 0 resource may be shared, e.g., among one or more (e.g., multiple) SL sessions.

An initial cyclic shift value may be included in SCI. One or more of the following may apply. A PSFCH format 0 resource may be shared, for example, among multiple sidelink sessions. In V2X (e.g., NR V2X) sidelink transmissions, an initial cyclic shift value for PSFCH format 0 may be indicated in SCI. A WTRU (e.g., another mode 2 WTRU performing sensing) may detect the initial cyclic shift value for PSFCH format 0. The WTRU (e.g., the other mode 2 WTRU) may avoid using the same initial cyclic shift value for PSFCH format 0 if, for example, the WTRU determines to allocate the PSFCH feedback on a resource (e.g., the same resource).

A PSFCH format 0 resource may be shared among the WTRUs (e.g., the different WTRUs) of a SL session (e.g., sidelink groupcast).

Code division multiplexing (CDM) sharing may be performed. An initial cyclic shift value may depend, for example, on WTRU IDs. One or more of the following may apply. A PSFCH format 0 resource may be used for a sidelink session. The PSFCH format 0 resource may be shared by multiple Rx WTRUs in a sidelink groupcast. In examples, different Rx WTRUs may use different initial cyclic shift values when using the same PSFCH format 0 resource. The initial cyclic shift value used by a WTRY may depend on the Rx WTRU's ID (e.g., RNTI, group member ID, etc.) and Tx WTRU's ID (e.g., RNTI, group member ID, etc.).

In examples, of a group of 4 WTRUs may include group member IDs (e.g., ID1, ID2, ID3, ID4). A Tx WTRU with ID1 may send PSSCH data to Rx WTRUs with ID2, ID3, and ID4, respectively. The Rx WTRU with ID2 may calculates the difference of its own ID and the Tx WTRU ID. The Rx WTRU with ID2 may determine an initial cyclic shift value. In examples, the Rx WTRU with ID2 may set its initial cyclic shift value as $m_0=|ID1-ID2| \mod 3$. The Rx WTRUs with ID3 or ID4 may set their initial cyclic shift value as $m_0=|ID1-ID3| \mod 3$ and $m_0=|ID1-ID4| \mod 3$, respectively.

Figure 2:
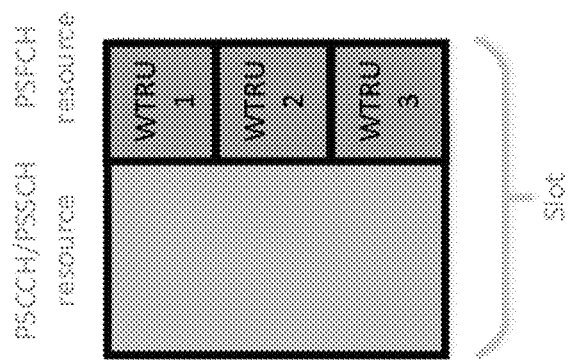
FIG. 2 illustrates example sharing of PSFCH resources for sidelink communications.

FDM sharing may be performed. A PRB's location may depend on a WTRU's ID. One or more of the following may apply. For sidelink groupcast, different WTRUs may use different portions of PSFCH resources. If PSFCH format 0 is used, a WTRU's (e.g., each WTRU's) HARQ-ACK/NACK feedback may occupy 1 or 2 symbols with 1 PRB. Different WTRUs in a sidelink groupcast may use the different PRBs of large PSFCH resources. The selection of the different PRBs of large PSFCH resources may depend on the group member ID or a WTRU's RNTI. FIG. 2 illustrates exemplary sharing (e.g., FDM sharing) of the PSFCH resource by multiple Rx WTRUs in a sidelink groupcast.

A PSFCH format 0 resource may not be shared (e.g., among multiple WTRUs). One or more of the following may apply. A PSFCH format 0 resource may be used for a Rx WTRU (e.g., a single Rx WTRU). PSFCH format 0 resource sharing may not be performed. An initial cyclic shift value for PSFCH format 0 may be indicated in SCI, e.g., so that the Rx WTRU may know the initial cyclic shift value for PSFCH format 0. A Rx WTRU may set the initial cyclic shift value, for example, to the difference between the Tx WTRU's ID and the Rx WTRU's ID.

A PSFCH format 0 for HARQ-NACK scheme in sidelink groupcast may be provided.

A HARQ-NACK scheme may be used (e.g., for a sidelink groupcast). In examples, for PSFCH format 0 to support a HARQ-NACK scheme, a sequence (e.g., Gold sequence with a certain cyclic shift value, such as, $m_{cs}=0$) may be used to indicate the HARQ-NACK. If different sidelink groupcast use different initial cyclic shift values (e.g., as indicated in the SCI), a PSFCH resource (e.g., the same PSFCH resource) may be shared among multiple sidelink sessions.

A single TB may be transmitted, and a single HARQ-NACK may be generated. If two TBs are transmitted, result scenarios that may be fed back include the following (e.g., depending on whether a TB is received). TB1 and TB2 may be received. TB1 may be received and TB2 may not be received. TB1 may not be received and TB2 may be received. TB1 and TB2 may not be received. A Rx WTRU may use a single sequence (e.g., Gold sequence with a unique cyclic shift value) to indicate a combined NACK, for example, if either of the TBs is not successfully decoded. A Rx WTRU may treat the two TBs separately. A Rx WTRU may use one or more sequences (e.g., three different sequences), such as, a Gold sequence with three different cyclic shift values.

Rx WTRUs may use a single sequence (e.g., Gold sequence with a unique cyclic shift value) to indicate a combined NACK, for example, if either of the TBs are not successfully decoded. A sequence amplitude scaling factor may be different, for example, to indicate whether a TB is not decoded correctly or whether both TBs are not decoded correctly. If a single TB is not decoded correctly, the sequence amplitude scaling factor may be small. If both TBs are not decoded correctly, the sequence amplitude scaling factor may be large. A Tx WTRU may retransmit the TBs, for example, if it receives a NACK (e.g., the combined NACK).

Rx WTRUs may use three different sequences (e.g., Gold sequence with three different cyclic shift values) to indicate one or more of the following: the first TB (e.g., only the first TB) is not decoded correctly; the second TB (e.g., only the second TB) is not decoded correctly; or both TBs are not decoded correctly. In examples: a Gold sequence with cyclic shift value $m_{cs}=0$ may be used to indicate that the first TB is not decoded correctly; a Gold sequence with cyclic shift value $m_{cs}=4$ may be used to indicate that the second TB is not decoded correctly; and a Gold sequence with cyclic shift value $m_{cs}=8$ may be used to indicate that both TBs are not decoded correctly. If a Tx WTRU detects the Gold sequence with cyclic shift value of $m_{cs}=8$, or if a Tx WTRU detects two Gold sequences with $m_{cs}=0$ and $m_{cs}=4$, then the Tx WTRU may retransmit the TBs (e.g., both TBs). If a Tx WTRU detects (e.g., only detects) a Gold sequence with cyclic shift value of $m_{cs}=0$, the Tx WTRU may retransmit (e.g., may only retransmit) the first TB. If a Tx WTRU detects (e.g., only detects) a Gold sequence with cyclic shift value of $m_{cs}=4$, the Tx WTRU may retransmit (e.g., may only retransmit) the second TB.

Rx WTRUs may treat the TBs (e.g., the two TBs) separately. The Rx WTRUs may use a sequence (e.g., Gold sequence with a unique cyclic shift value) to indicate a NACK for a TB (e.g., for each TB). A sequence corresponding to the first TB may be mapped in the first PSFCH resource and a sequence corresponding to the second TB may be mapped in the second PSFCH resource. The first PSFCH resource may be TDM-ed or FDM-ed multiplexed. In a TDM-ed multiplexing scenario one or more of the following may apply. A symbol (e.g., the first symbol of a PSFCH resource) may include the sequence corresponding to the first TB. A symbol (e.g., the second symbol of a PSFCH resource) may include the sequence corresponding to the second TB. In FDM-ed multiplexing scenario, one or more of the following may apply. A PRB (e.g., the first PRB of a PSFCH resource) may include the sequence corresponding to the first TB. A PRB (e.g., the second PRB of a PSFCH resource) may include the sequence corresponding to the second TB. A Rx WTRU (e.g., each Rx WTRU) may insert the first and/or the second sequence to the first and/or the second PSFCH resource (e.g., the proper PSFCH resources, depending on the decoding result). If a Tx WTRU detects the sequence in the proper PSFCH resource(s), the Tx WTRU may determine whether a TB is to be retransmitted (e.g., zero, one, or two TBs are to be retransmitted).

A PSFCH format 1 design may be provided. An indication of an initial cyclic shift value and OCC index may be provided (e.g., in SCI). An initial cyclic shift value and/or OCC sequence index may depend of a WTRU ID.

A PFSCH format 1 design may be provided. An indication (e.g., a dynamic indication) of an initial cyclic shift value and/or OCC index may be provided. PUCCH format 1 may support user multiplexing on the same PUCCH resource (e.g., in NR). A PUCCH resource (e.g., each PUCCH resource associated with PUCCH format 1) may be configured with an initial cyclic shift value. WTRUs may share a common PUCCH format 1 resource, for example, by using different OCC sequences for spreading. One or more (e.g., up to 7) OCC sequences may be used for PUCCH format 1 with 14 symbols. If up to 7 OCC sequences are used for PUCCH format 1 with 14 symbols, a PUCCH format 1 resource may be shared by up to 7 WTRUs.

An initial cyclic shift value and OCC index for PSFCH format 1 may be indicated (e.g., dynamically indicated), which may not depend on the PSFCH resource.

PSFCH format 1 resource sharing among multiple SL sessions may be provided.

Initial cyclic shift value and/or OCC index may be included in SCI. A PSFCH format 0 resource (e.g., the same PSFCH format 0 resource) may be shared among multiple sidelink sessions. In V2X (e.g., NR V2X) sidelink transmissions, an initial cyclic shift value and/or OCC index for PSFCH format 1 may be indicated in SCI. A WTRU (e.g., another mode 2 WTRU) performing sensing may detect the initial cyclic shift value and/or OCC index. The WTRU (e.g., the other mode 2 WTRU) may not use the same initial cyclic shift value and/or OCC index for PSFCH format 1, for example, if the WTRU determines to allocate PSFCH feedback on the same resource.

PSFCH format 1 resource sharing among the WTRUs of a SL session (e.g., a single SL session) may be provided.

An initial cyclic shift value and/or OCC sequence index may depend on a WTRU's ID. A PSFCH format 1 resource may be used for a sidelink session. The PSFCH format 1 resource may be shared by one or more Rx WTRUs in a sidelink groupcast. The Rx WTRUs may use different initial cyclic shift values and/or OCC sequences, for example, if using the same PSFCH format 1 resource. An initial cyclic shift value and/or OCC sequence used by a WTRU may depend on the Rx WTRU's ID (e.g., RNTI, group member ID, etc.) and the Tx WTRU's ID (e.g., RNTI, group member ID, etc.).

In examples, a Tx WTRU with $ID_0$ may send PSSCH data to Rx WTRUs. The i-th Rx WTRU with may calculate the difference between its own ID and Tx WTRU's ID. One or more of the following may apply. The i-th Rx WTRU with IR may determine an initial cyclic shift value as $m_0 = |ID_0 - ID_i| \mod 12$. The i-th Rx WTRU may determine the OCC sequence index as $i = |ID_0 - ID_1| \mod 7$. The i-th Rx WTRU may determine the initial cyclic shift value and OCC sequence index based on the difference between its own ID and Tx WTRU's ID. One or more (e.g., 12) initial cyclic shift values and one or more (e.g., 7) OCC sequences may be used. One or more (e.g., 84) combinations of initial cyclic shift values and OCC sequences may be used.

A PSFCH format 1 resource may not be shared by multiple WTRUs.

A PSFCH format 1 resource may be used for a Rx WTRU. PSFCH format 1 resource sharing may not be performed. One or more of the following may apply. An initial cyclic shift value and/or OCC sequence index for PSFCH format 1 may be indicated in SCI so that, for example, the Rx WTRU may know the initial cyclic shift value and/or OCC sequence index. A Rx WTRU may set the initial cyclic shift value and/or OCC sequence index as the difference between the Tx WTRU's ID and the Rx WTRU's ID.

PSFCH format 2 design may be provided. The number of PRBs for PSFCH format 2 resource may be indicated in SCI. The SFCI code rate may be indicated in SCI. A WTRU ID may be embedded for a PSFCH format 2. A Tx WTRU may select the PSFCH format 0 resource and/or PSFCH format 1 resource. A Rx WTRU may select the PSFCH format 2 resource.

A PSFCH format 2 design may be provided. A PSFCH format 2 may be used to transmit HARQ-ACK/NACK bits for CBG-based transmissions, sidelink CSI (e.g., including CQI, PMI, RI, etc.), and/or sidelink RSRP/RSRQ. The techniques described herein may be used to transmit HARQ-ACK/NACK bits and sidelink CSI. Similar techniques may be applied to perform RSRP/RSRQ feedback.

A SFCI payload may be concatenated, for example, by putting HARQ-ACK/NACK bits before sidelink CSI bits. Segmentation may be applied, for example, depending on the SFCI payload size. A segment (e.g., each segment) may be appended with a CRC (e.g., 6-bit 11-bit CRC). A segment may not be appended with a CRC, e.g., depending on the segment's size. In examples, if the payload size is below 12 bits, a CRC may not be appended and a code (e.g., a Reed Muller code) may be used. If the payload size is between 12 bits and 19 bits, a 6-bit CRC may be appended, and polar coding may be applied. If the payload size is above 19 bits, an 11-bit CRC may be appended, and polar coding may be applied.

The number of PRBs for a PSFCH format 2 resource may be indicated in SCI.

The number of PRBs for PSFCH format 2 may be indicated in SCI, for example, by a Tx WTRU. The Tx WTRU may perform a sensing and may select the PSFCH resource for the Rx WTRU.

The Rx WTRU may select a code rate $r_{min}$, for example, from a list of possible code rate values, such that the selected code rate $r_{min}$ is the minimum value among the possible values satisfying:

$$M_{RB}^{PSFCH} \cdot N_{SC,ctrl}^{RB} \cdot N_{symb-SFCI}^{PSFCH} \cdot Q_m \cdot r_{min} \geq SFCI_{size}$$

$M_{RB}^{PSFCH}$ may indicate the number of PRBs (e.g., between 1 and 16) indicated in the SCI. $N_{SC,ctrl}^{RB}$ may indicate the number of subcarriers in a PRB carrying SFCI information (e.g., 8). $N_{symb-SFCI}^{PSFCH}$ may indicate the number of OFDM symbols in PSFCH format 2 (e.g., 1 or 2) indicated in SCI. $Q_m$ may indicate the modulation order (e.g., QPSK=2) of PSFCH format 2. $SFCI_{size}$ may indicate the SFCI payload size. The list of possible values of code rate $r$ may be specified or configured (e.g., pre-specified or pre-configured). In examples, the list of possible values of code rate $r$ may include: 0.08, 0.15, 0.25, 0.35, 0.45, 0.6, 0.8.

A Tx WTRU may determine the number of PRBs for PSFCH format 2 resource, for example, based on one or more of the following: the data's Quality of Service (QoS), the sensing results of a PSFCH resource, the number of group members, etc. A Tx WTRU may select a number (e.g., a large number) of PRBs so that the feedback may provide the coding gain for a reliable transmission (e.g., for high reliability data). A Tx WTRU may select a small number of PRBs (e.g., for low reliability data).

The SFCI code rate may be indicated in SCI.

A Tx WTRU may indicate a code rate of SFCI in SCI. If the code rate of SFCI is indicated in SCI, the number of PRBs for PSFCH format 2 may or may not be indicated in SCI. The number of PRBs for PSFCH format 2 may be indicated in SCI if, for example, the Tx WTRU performs sensing and selects the PSFCH format 2 resource for the Rx WTRU. The number of PRBs for PSFCH format 2 may not be indicated in SCI if the Rx WTRU performs sensing and selects the PSFCH format 2 resource.

The Tx WTRU may select the SFCI code rate based on data QoS and the sensing results on PSFCH resources. A small code rate may be selected (e.g., for high reliability data). A large code may be selected (e.g., for low reliability data).

If the SFCI code rate is provided in SCI and the number of PRBs for PSFCH format 2 is not indicated in SCI, the Rx WTRU may determine the number of PRBs (e.g., between 1 and 16) for PSFCH format 2. The number of PRBs for PSFCH format 2 may be determined as $M_{RB,min}^{PSFCH}$, the minimum number may be between 1 and 16, such that:

$$M_{RB,min}^{PSFCH} \cdot N_{SC,ctrl}^{RB} \cdot N_{symb-SFCI}^{PSFCH} \cdot Q_m \cdot r \geq SFCI_{size}$$

One or more of the following may apply. $N_{SC,ctrl}^{RB}$ may indicate the number of subcarriers in a PRB carrying SFCI information (e.g., 8). $N_{symb-SFCI}^{PSFCH}$ may indicate the number of OFDM symbols in PSFCH format 2 (e.g., 1 or 2) indicated in SCI. $Q_m$ may indicate the modulation order (e.g., QPSK=2) of PSFCH format 2. r may indicate the SFCI code rate indicated in SCI. $SFCI_{size}$ may indicate the SFCI payload size.

The maximum allowable SFCI payload size (e.g., including CRC) carried in a PSFCH format 2 may be derived by 16*8*2*2*0.8=409, where the maximum code rate selected may include 0.8 and the number of OFDM symbols may include 2. If the SFCI payload is larger than a threshold (e.g., 409 bits), filtering among the CSI reports may be applied.

A WTRU ID may be embedded for PSFCH format 2.

If a Tx WTRU reserves a PSFCH format 2 resource for a Rx WTRU, the Rx WTRU may not include the WTRU ID in the feedback. If the Rx WTRU reserves the PSFCH format 2 resource, the Rx WTRU may include its ID in the feedback (e.g., for groupcast sidelink), which may allow the Tx WTRU to know which Rx WTRU sent the feedback and may avoid confusion if the Tx WTRU is simultaneously supporting multiple sessions (e.g., of sidelink unicast or groupcast).

A Rx WTRU's ID may be included in feedback. One or more of the following may apply. A Rx WTRU may set its ID as a part of the payload of SFCI, which may be transmitted together with HARQ-ACK/NACK and/or sidelink CSI bits. The Rx WTRU's ID may be placed before the HARQ-ACK/NACK bits and Sidelink CSI bits. Part or all of Rx WTRU's ID may be used to mask the CRC of SFCI. If the SFCI payload is larger than 12 bits, a CRC (e.g., a 6 or 11 bit CRC) may be generated before polar encoding of SFCI. One or more bits (e.g., 6 or 11 bits) may be generated from the Rx WTRU's ID, for example, to mask the CRC of SFCI. The Rx WTRU's ID may be used to generate a scrambling sequence, which may be used to scramble the polar encoded and rate matched bits from SFCI. The scrambling sequence include, for example, a length-31 gold sequence with an initial value based on the Rx WTRU's ID and/or the Tx WTRU's ID. An initialization value for the PSFCH scrambling sequence may be a function of Rx WTRU's ID and/or the Tx WTRU's ID and may be set as:

$$C_{init}=ID_{Rx} \cdot 2^A + ID_{Tx},$$

One or more of the following may apply. $ID_{Rx}$ may indicate the Rx WTRU's ID. $ID_{Tx}$ may indicate the Tx WTRU's ID. The value A may include 15, or may depend on the length of the Tx WTRU's ID.

A Tx WTRU may select a PSFCH format 0 resource and/or PSFCH format 1 resource. A Rx WTRU may select a PSFCH format 2 resource.

PSFCH format 0 and format 1 may support user multiplexing on the same resource. PSFCH format 2 may not support user multiplexing on the same resource. A Tx WTRU may select a common PSFCH format 0 resource and/or format 1 resource for one or more Rx WTRUs to share (e.g., in sidelink groupcast). The location of a PSFCH format 0 or format 1 resource may be indicated. For a PSFCH format 2 resource, a Rx WTRU may select its own resource to send SFCI. A Tx WTRU may not reserve the PSFCH format 2 resources for the Rx WTRUs (e.g., each Rx WTRU).

PSFCH format 0 resources may be used for sidelink unicast and PSFCH format 1 resources may be used for sidelink groupcast (e.g., due to its capability of supporting more WTRUs sharing the same PSFCH format 1 resources).

One or more techniques associated with the PSFCH may be provided. A Tx WTRU may determine a HARQ feedback scheme and PFSCH formats. A Tx WTRU may perform sensing in consideration of the PFSCH. A Rx WTRU may receive transmissions (e.g., unicast or groupcast) on PSSCH and may prepare HARQ feedback.

A WTRU may select feedback formats to be used with sidelink communications. A WTRU may select to transmit data using sidelink unicast transmission or sidelink groupcast transmission. Depending upon which transmission type is selected and one or more additional factors, the WTRU may select to use either HARQ ACK/NACK or HARQ NACK feedback in connection with transmitting the data. The WTRU may also select to use either PSFCH format 0 or PSFCH format 1 for feedback depending upon whether unicast or groupcast communication is used as well as one or more additional factors.

A Tx WTRU may determine the HARQ feedback scheme. If the HARQ feedback scheme is enabled, a Tx WTRU may determine the HARQ feedback schemes and the PSFCH formats, for example, based on a number of criteria such as, for example, the number of Rx WTRUs, the SFCI payloads, etc.

Figure 3:
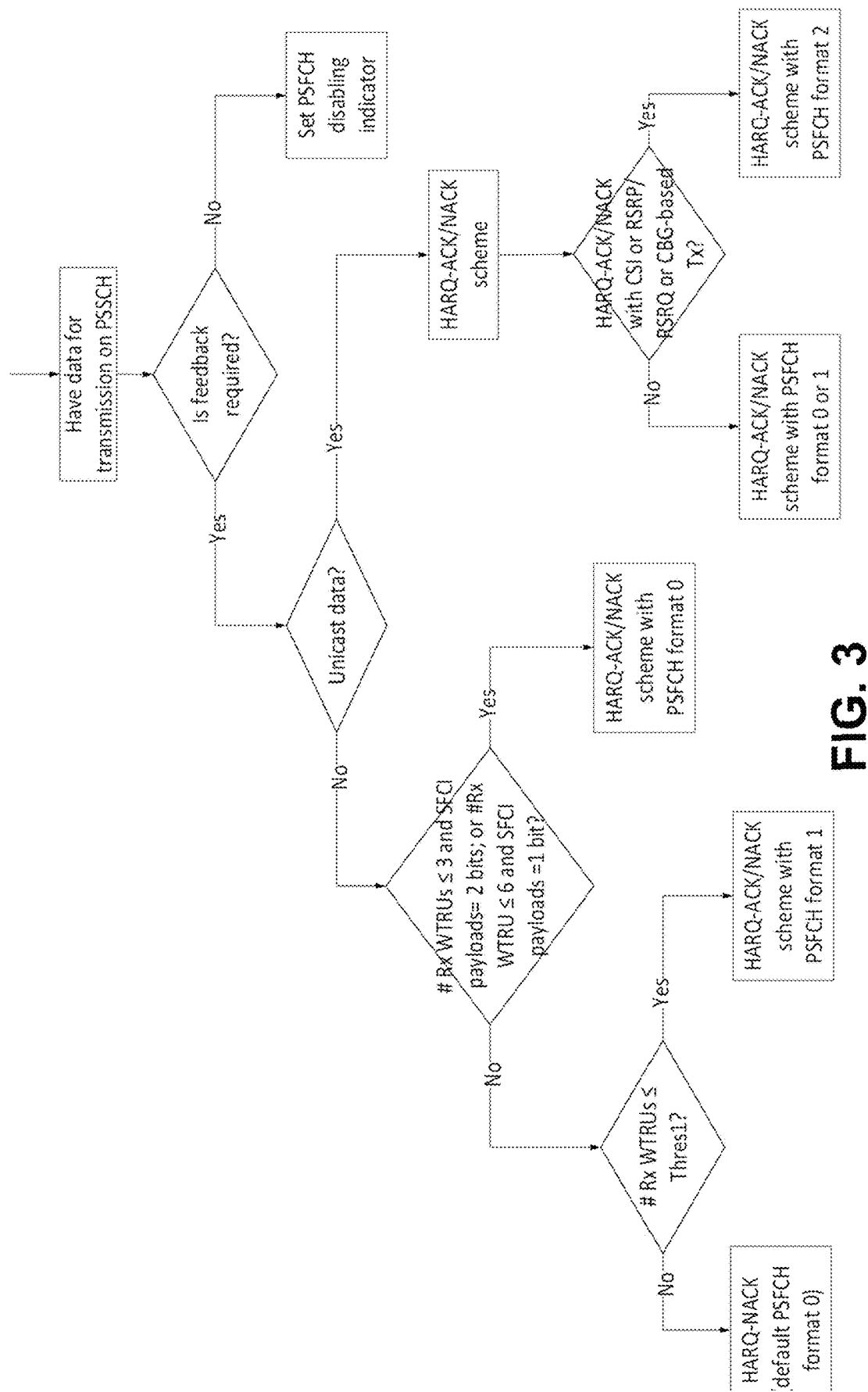
FIG. 3 illustrates example selecting HARQ feedback schemes and PSFCH formats.

FIG. 3 illustrates example implementations associated with a Tx WTRU selecting HARQ feedback schemes and PSFCH formats. A WTRU may receive data to be sent over PSSCH. The WTRU may receive instructions from higher layers, for example, for determining whether the HARQ feedback may be used for a transmission. A WTRU may determine whether HARQ feedback is performed, for example, based on a data's QoS characteristics, the number of Rx WTRUs, or network congestion. If feedback is not performed, a WTRU may set a "PSFCH disabling indicator," for example, in SCI. If feedback is performed, a WTRU may set the "PSFCH enabling indicator," for example, in SCI.

A WTRU may select between PSFCH formats and HARQ feedback schemes. As shown in FIG. 3, if the data is for unicast sidelink transmission, then a HARQ-ACK/NACK scheme may be used. One or more of the following may apply. Non-CBG based HARQ-ACK/NACK bit(s) may be sent, for example, independently using PSFCH format 0 or format 1. HARQ-ACK/NACK bit(s) may be sent together with CSI feedback using PSFCH format 2. Or the CBG-based HARQ-ACK/NACK bits may be sent using PSFCH format 2.

Non-CBG based HARQ-ACK/NACK bit(s) may be sent independently using PSFCH format 0 or format 1. One or more of the following may apply. The selection between different PSFCH formats e.g., PSFCH format 0 and format 1, may depend on, for example, the channel busy ratio. PSFCH format 0 may be selected for a high channel busy ratio (e.g., as PSFCH format 0 may comprise 1 or 2 symbols). PSFCH format 1 may be selected for a low channel busy ratio (e.g., as PSFCH format 1 may comprise 4-14 symbols). The selection between different PSFCH formats, e.g., PSFCH format 0 and format 1, may depend on the sensing results on PSFCH resources. If more than 4 OFDM symbols are available on a resource, format 1 may be used. If more than 4 OFDM symbols are not available on a resource, PSFCH format 0 may be used. The selection between PSFCH format 0 and format 1 may depend on a data's QoS characteristics or requirements, e.g., reliability or a minimum communication range. For data with high reliability and a large minimum communication range, for example, PSFCH format 1 may be selected. For data without high reliability or a large minimum communication range, format 0 may be selected.

The HARQ-ACK/NACK bit(s) may be sent (e.g., together with CSI feedback) using PSFCH format 2. The CBG-based HARQ-ACK/NACK bits may be sent using PSFCH format 2.

As shown in FIG. 3, if data is associated with groupcast, a HARQ-ACK/NACK scheme or HARQ-NACK scheme may be used. The selection between a HARQ-ACK/NACK scheme and a HARQ-NACK scheme may depend on at least one or more of the following: the number of Rx WTRUs, channel congestion conditions, or data QoS characteristics or requirements.

The number of Rx WTRUs may be used to select between a HARQ-ACK/NACK scheme and a HARQ-NACK scheme. One or more of the following may apply. For a small number of Rx WTRUs (e.g., less than Thres1), a HARQ-ACK/NACK scheme may be used. For a number (e.g., large number) of Rx WTRUs (e.g., more than or equal to Thres1), a HARQ-NACK scheme may be used. If the number of Rx WTRUs is unknown to the Tx WTRU, a HARQ-NACK scheme may be used.

Channel congestion conditions may be used to select between a HARQ-ACK/NACK scheme and a HARQ-NACK scheme. One or more of the following may apply. For high load channel conditions, a HARQ-NACK scheme may be used (e.g., to save the feedback resources). For low load channel conditions, a HARQ-ACK/NACK scheme may be used.

Data QoS characteristics may be used to select between a HARQ-ACK/NACK scheme and a HARQ-NACK scheme. One or more of the following may apply. For high-reliability data, a HARQ-ACK/NACK scheme may be used (e.g., since a HARQ-ACK/NACK scheme may avoid DTX issues, which may apply in a HARQ-NACK scheme). For non-high-reliability data, a HARQ-NACK scheme may be used. For latency-critical data, for example, a HARQ-ACK/NACK scheme may be used. For non-latency-critical data, a HARQ-NACK scheme may be used.

If a HARQ-NACK scheme is used, the PSFCH format 0 may be used (e.g., by default), where a sequence (e.g., a fixed or a (pre-)configured sequence) may be used to indicate a NACK.

If a HARQ-ACK/NACK scheme is used, a selection between different PSFCH formats, e.g., PSFCH format 0 and format 1, may depend at least upon on one or more of the following: a channel busy ratio, sensing results on PSFCH resources, data QoS characteristics, or the number of group members and/or SFCI payload size.

A channel busy ratio may be used to select between different PSFCH formats, e.g., PSFCH format 0 and format 1, if a HARQ-ACK/NACK scheme is used. One or more of the following may apply. PSFCH format 0 may be selected for a high channel busy ratio (e.g., as it may comprise 1 or 2 symbols). For low channel busy ratio, PSFCH format 1 may be selected for a low channel busy ratio (e.g., as it may comprise 4-14 symbols).

Sensing results on PSFCH resources may be used to select between different PSFCH formats, e.g., PSFCH format 0 and format 1, if a HARQ-ACK/NACK scheme is used. One or more of the following may apply. If more than 4 OFDM symbols are available on a resource, format 1 may be used. If more than 4 OFDM symbols are not available on a resource, format 0 may be used.

Data QoS characteristics, e.g., reliability requirements or minimum required communication range, may be used to select between different PFSCH formats, e.g., PSFCH format 0 and format 1, if a HARQ-ACK/NACK scheme is used. One or more of the following may apply. For data associated with high reliability and a large minimum communication range, PSFCH format 1 may be selected. For data that is not associated with high reliability and a large minimum communication ranges, format 0 may be selected.

The number of group members and/or SFCI payload sizes may be used to select between different PSFCH formats, e.g., PSFCH format 0 and format 1, if a HARQ-ACK/NACK scheme is used. One or more of the following may apply. If the number of Rx WTRUs is no more than 3 and the SFCI includes 2-bits, PSFCH format 0 may be used. If the number of Rx WTRUs is no more than 6 and SFCI includes 1-bit, PSFCH format 0 may be used. If the number of Rx WTRUs is more than 3 and the SFCI includes 2-bits, PSFCH format 1 may be used. If the number of Rx WTRUs is more than 6, PSFCH format 1 may be used.

CBG-type transmissions may be used (e.g., may only be used) for SL unicast transmission (e.g., and not the SL groupcast transmission).

A Tx WTRU's sensing implementation with considerations of PFSCH may be provided.

Figure 4:
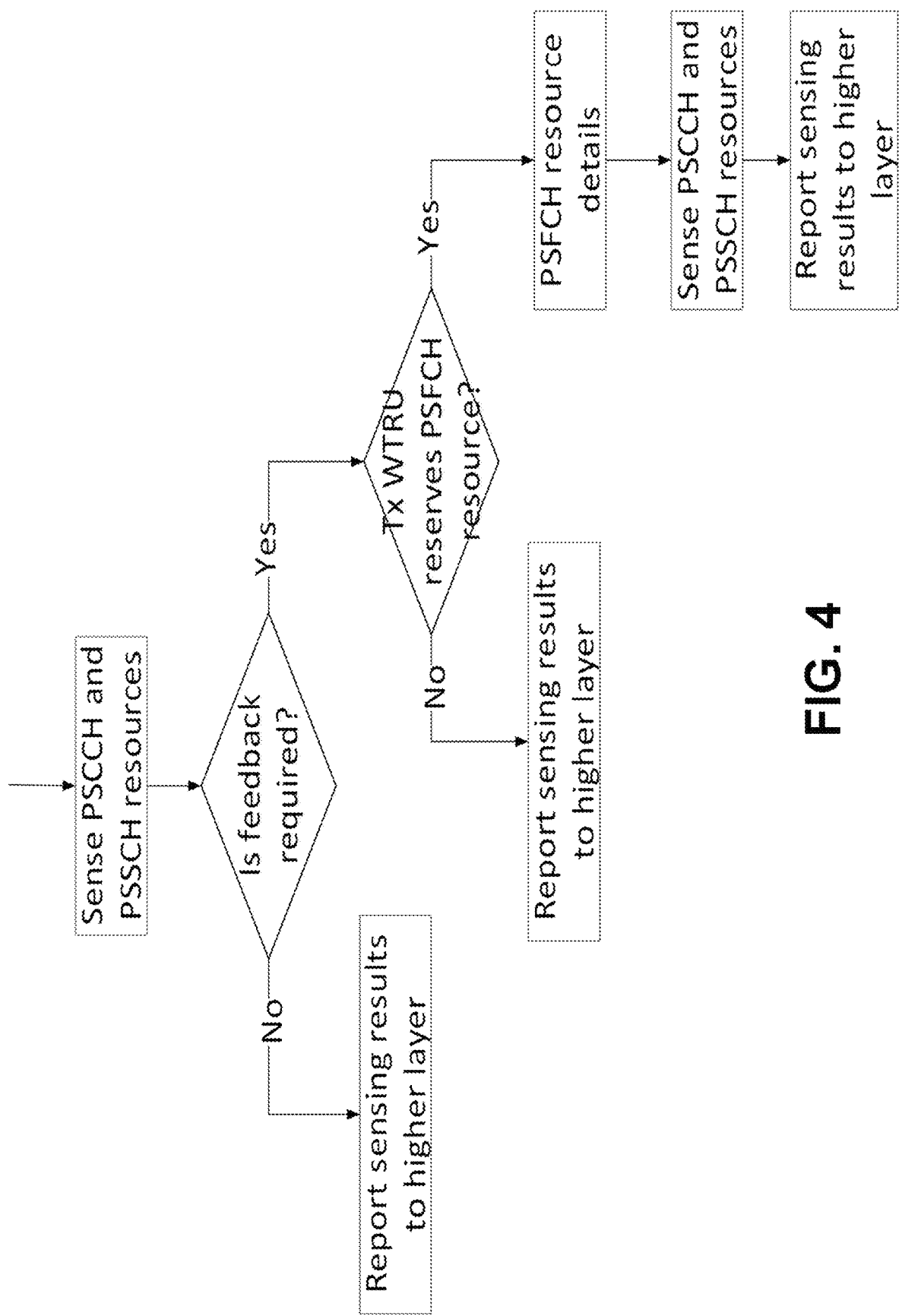
FIG. 4 illustrates example resource sensing.

If a Tx WTRU (e.g., a mode 2 Tx WTRU) reserves PSFCH resources for Rx WTRU, the Tx WTRU's sensing implementation may consider PFSCH. FIG. 4 is an exemplary illustration associated with a mode 2 WTRU sensing implementation with consideration of PSFCH. One or more of the following may apply. A WTRU may sense (e.g., may first sense) the PSCCH and PSSCH resources. The WTRU may determine whether feedback for the SL transmission is to be transmitted. If feedback is not to be transmitted, the WTRU may report the sensing results of PSCCH/PSSCH (e.g., to higher layer). If feedback is to be transmitted, the WTRU may determine whether the Tx WTRU are to reserve PSFCH resources. If PSFCH resources are not to be reserved, the Tx WTRU may report the sensing results of PSCCH/PSSCH (e.g., to higher layer). If PSFCH resources are to be reserved, the Tx WTRU may obtain the information on PSFCH resource details which may include, for example, PSFCH format, PSFCH time-domain resource size, PSFCH frequency-domain resource size, the number of WTRUs sharing a common resource, the timing relation between the PSCCH/PSSCH resource, and PSFCH resource, etc. The Tx WTRU may perform sensing for PSFCH resources, for example, based on the PSFCH resource detail. The Tx WTRU may report the sensing results for PSCCH/PSSCH and PSFCH, for example, to higher layers.

PSFCH resource sensing may be provided. A sensing implementation for PSFCH resources may include one or more of the following: determining a transmission window for PSFCH; determining a candidate set $S_A$ from S (e.g., based on the on the RSRP level of candidate resources); removing a resource $R_{x,y}$ from the candidate resource set $S_A$, if it conflicts with the resource $R_{x,y}$'s own transmissions or other WTRU's reserved PSFCH resources (e.g., mode 1 reserved resources); ranking the set $S_A$ of resources (e.g., based on its RSSI values averaged over the past several slots); or reporting resources to higher layers.

The transmission window for PSFCH may be determined. One or more of the following may apply. The sensing for PSCCH/PSSCH resources may use a transmission window of $[n+T_1, n+T_2]$. The sensing for PSFCH resources may use a transmission window of $[n+T_3, n+T_4]$, where $T_4 > T_3 > T_1$. The selection of $T_3$ and $T_4$ may depend, for example, on the selected PSCCH/PSSCH resources. A candidate resource may include $R_{x,y}$ and the set of candidate resources may include S. The candidate resource size may depend, for example, on one or more of the following: PSFCH format, PSFCH time-domain resource size, PSFCH frequency-domain resource size, etc.

A candidate set $S_A$ may be determined from S (e.g., based on the on the RSRP level of candidate resources). One or more of the following may apply. If a candidate resource in S has RSRP level above a threshold, the candidate resource may be saved to $S_A$.

A resource $R_{x,y}$ may be removed from the candidate resource set $S_A$ if it conflicts with the resource $R_{x,y}$'s own transmissions or other WTRU's reserved PSFCH resources (e.g., mode 1 reserved resources). One or more of the following may apply. The reserved PSFCH resources may include the reserved parameters of certain PSFCH formats. In examples, if a PSFCH format 0 resource is shared among multiple SL sessions, the reserved initial cyclic shifts may be marked for the resource avoidance. The initial cyclic shifts and/or OCC sequence may be a part of the PSFCH resource (e.g., in the PSFCH sensing implementation).

The set $S_A$ of resources may be ranked (e.g., based on its RSSI values averaged over the past several slots). One or more of the following may apply. If the number of remaining candidate resources in $S_A$ (e.g., after removing the resource $R_{x,y}$ from the candidate resource set $S_A$) is no more than Thres2*$M_{total}$, a candidate set $S_A$ may be from S (e.g., based on the RSRP level of candidate resources) with a smaller threshold. If the number of remaining candidate resources in $S_A$ (e.g., after removing the resource $R_{x,y}$ from the candidate resource set $S_A$) is more than Thres2*$M_{total}$, the set $S_A$ of resources may be ranked (e.g., based on its RSSI values averaged over the past several slots). Thres2 may be different from the threshold in PSCCH/PSSCH sensing implementation.

Ranked resourced (e.g., the first Thres2*$M_{total}$ ranked resources, such as, $S_B$) may be reported to higher layers for resource selection (e.g., for the final resource selection).

A Rx WTRU may receive a unicast or groupcast PSSCH.

Figure 5:
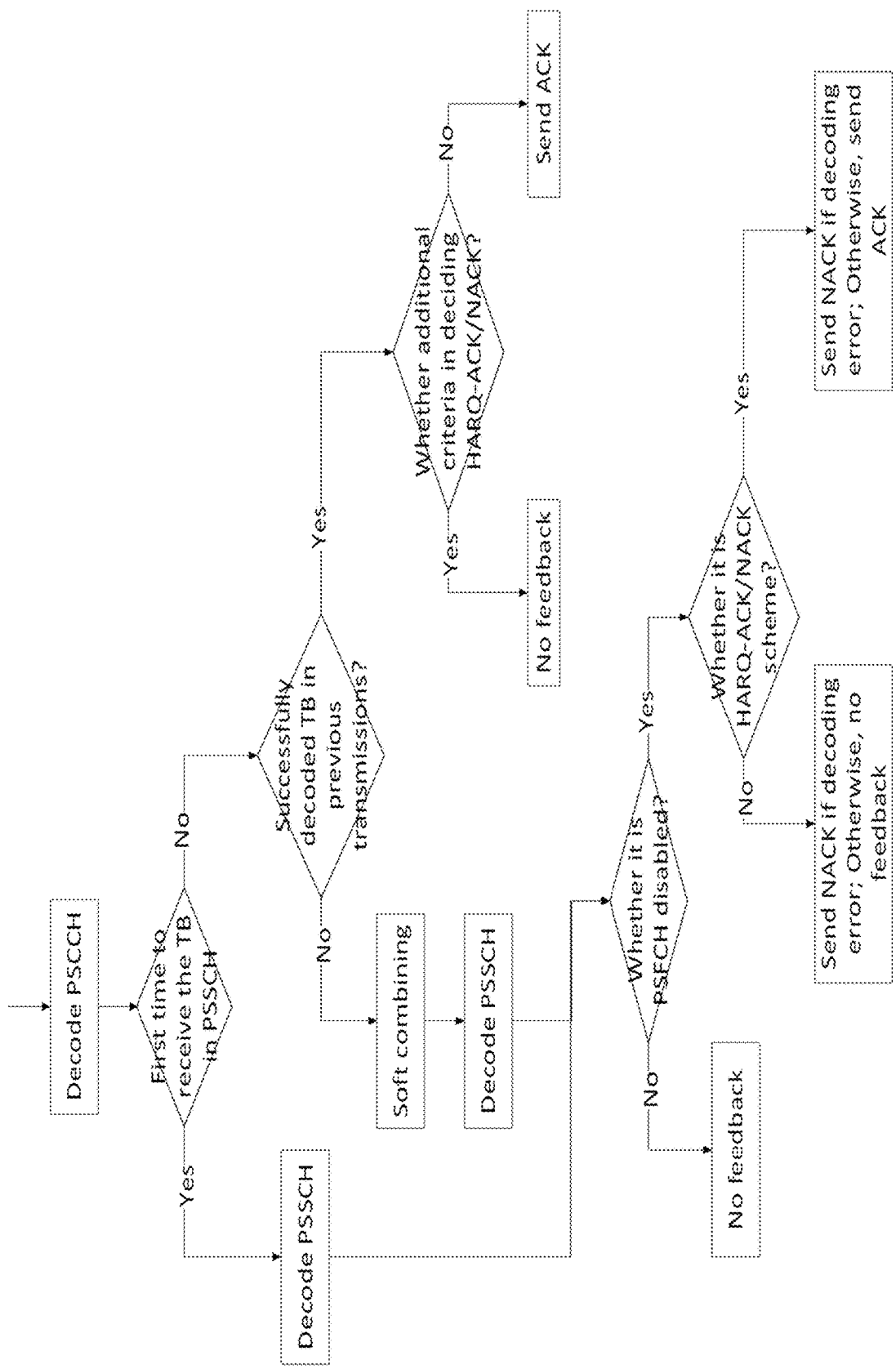
FIG. 5 illustrates example PSCCH and PSSCH decoding.

FIG. 5 shows an exemplary illustration associated with a Rx WTRU if it receives unicast or groupcast SL data. One or more of the following may apply. The WTRU may decode (e.g. may first decode) the PSCCH. Based on the SCI information (e.g., HARQ process ID, NDI fields in SCI), the WTRU may determine whether a TB is transmitted (e.g., a TB is first transmitted or not). One or more of the following may apply. If a TB is transmitted, a WTRU may attempt to decode the TB. If a TB is not transmitted, the WTRU may determine whether it has already decoded the TB in a previous transmission. If an SCI field indicates that the "PSFCH disabled indicator" is ON, the WTRU may not send feedback. If an SCI field(s) indicates that the "PSFCH disabled indicator" is OFF and that the "HARQ-NACK" scheme is to be used, the WTRU may send NACK bit(s) (e.g., if the WTRU has a PSSCH decoding error). The WTRU may not send anything (e.g., any bits) if the WTRU has successfully decoded the PSSCH. If an SCI field(s) indicates that the "PSFCH disabled indicator" is OFF and the "HARQ-ACK/NACK" scheme is to be used, the WTRU may send NACK bit(s) if the WTRU has a PSSCH decoding error or the WTRU may send ACK bits if the WTRU has successfully decoded the PSSCH.

If a TB is not transmitted, the WTRU may determine whether it has already decoded the TB in a previous transmission. One or more of the following may apply. If the WTRU already decoded the TB in a previous transmission, the WTRU may determine the feedback (e.g., depending on the decoded SCI information). If the SCI indicates that the PSFCH is disabled or that the WTRU is to transmit an ACK for a TB, the WTRU may not send feedback. If the SCI indicates that the WTRU is to transmit an ACK (e.g., for every PSSCH transmission), the WTRU may send one or more ACK bits. If the WTRU has not decoded the TB in a previous transmission, the WTRU may combine the versions (e.g., the soft versions) of the previously saved redundancy values RV(s) for the PSSCH decoding.

The PSSCH format and time and frequency resources may be indicated, for example, in SCI fields, e.g., if any ACK or NACK bits are to be sent from the WTRU.

SFCI transmissions may be performed on PSSCH. A WTRU may report sidelink CSI on PSSCH. Aperiodic CSI reporting may be performed. Semi-persistent CSI reporting may be performed. The resources for SFCI may be calculated. A beta offset may be signaled. A Tx WTRU may activate SFCI piggyback on PSSCH and may determine the beta-offset. A Tx WTRU may activate SFCI piggyback on PSSCH and a Rx WTRU may determine the beta-offset. A Rx WTRU may activate SFCI piggyback on PSSCH and may determine the beta-offset.

SFCI transmissions may be provided on the PSSCH. A WTRU may report sidelink CSI on PSSCH. The resources for SFCI may be calculated. A beta_offset may be signaled.

A WTRU may report sidelink CSI on PSSCH. CSI reporting (e.g., in NR UL) may be: aperiodic on the PUSCH, periodic on the PUCCH, Semi-Persistent (SP) on the PUCCH, or SP on PUSCH. CSI Reference Signals (CSI-RS) may be used as the reference signal for a CSI measurement. A reference signal may be extended to CSI Interference Measurement (CSI-IM) and CSI-RS for interference measurement. One or more of the following may apply.

Aperiodic CSI reporting may be performed.

Figure 6:
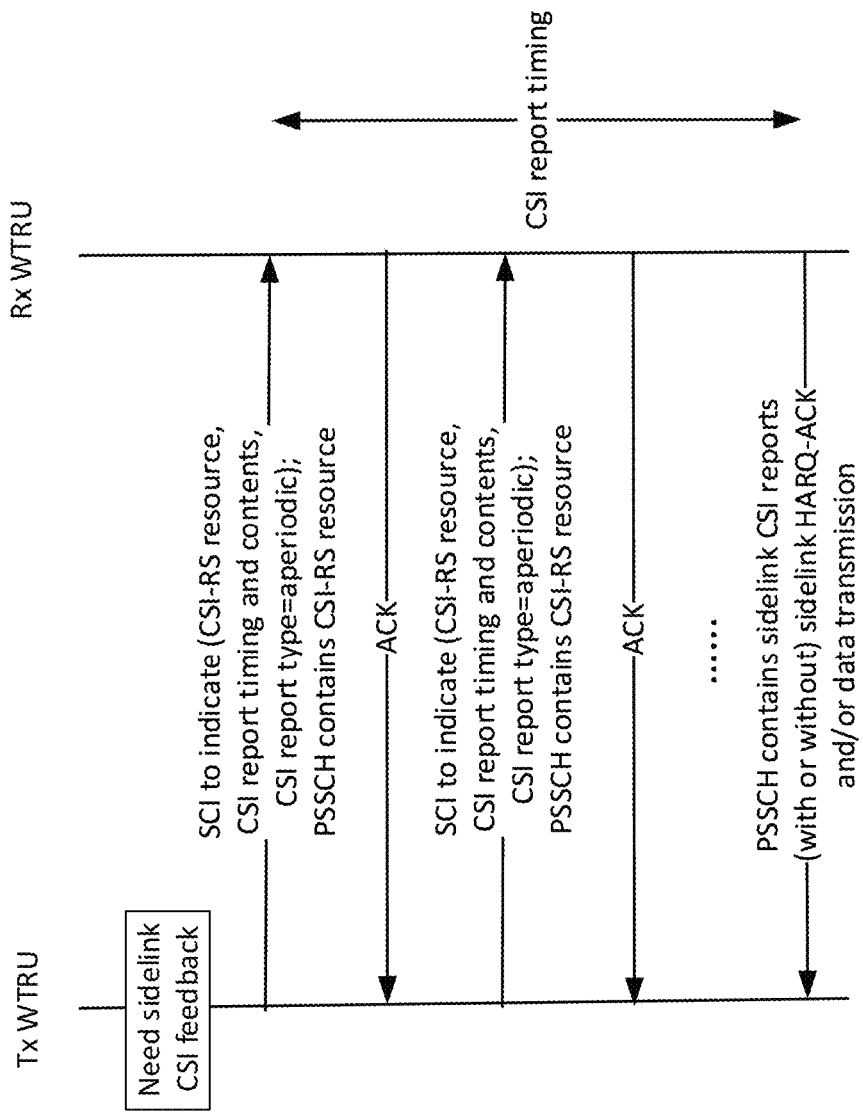
FIG. 6 illustrates example report scheduling.

A sidelink CSI may be reported on PSSCH, e.g., in terms of aperiodic and semi-persistent. For aperiodic CSI reporting, a Tx WTRU may collect sidelink CSI feedback from the Rx WTRU(s). FIG. 6 shows an exemplary illustration associated with a Tx WTRU scheduling an aperiodic CSI report.

A Tx WTRU may send a PSSCH, which may include a sidelink CSI-RS for Rx WTRU(s) to measure. The SCI associated with the PSSCH transmission may include one or more of the following information: the sidelink CSI-RS resource; or the CSI report type, timing, and/or contents.

The SCI associated with the PSSCH transmission may include the sidelink CSI-RS resource. One or more of the following may apply. The frequency (e.g., PRBs) and time (e.g., OFDM symbols) resources for sidelink CSI-RS may be indicated (e.g., for the Rx WTRU to measure the channel).

The SCI associated with the PSSCH transmission may include the CSI report type, timing, and contents. One or more of the following may apply. The CSI report type may be aperiodic, and the CSI report contents may include CQI, RI, PMI, LI, RSRP. The CSI report timing may be in terms of number of slots, (e.g., starting from the slot of PSSCH to activate the CSI reporting or starting from the slot of sending ACK for the PSSCH to activate the CSI reporting). If the CSI report timing expires, the Rx WTRU may perform sensing operations (e.g., to find the PSSCH resources that includes the sidelink CSI information). The CSI report timing may depend on, for example, the channel availability. In examples, if the CSI report timing expires, the Rx WTRU may not find a PSSCH resource to report CSI and the report timing may be delayed.

CSI report time windows may be provided. A Tx WTRU may set an SCI field(s) to provide a time window for the CSI report. A Rx WTRU may perform PSSCH resource selection within the time window.

CSI report timing may depend on the number of CSI-RS resources. One or more of the following may apply.

A Tx WTRU may set an SCI field(s) to provide CSI report timing (e.g., in terms of the number of PSSCH transmissions including CSI-RS resources). In examples, after receiving X PSSCH transmissions with CSI-RS resources, the Rx WTRU may report the sidelink CSI.

The CSI report timing may be based on a counter (e.g., a number that is decremented based on the remaining number of PSSCH (e.g., with a CSI-RS resource) transmissions before CSI report). For example: in an initial PSSCH transmission with CSI-RS resources, the counter may include X; in a second PSSCH transmission with CSI-RS resources, the counter may include X−1; in a third PSSCH transmission with CSI-RS resources, the counter may include X−2, etc. In examples, if the counter reaches 0, a Rx WTRU may find a PSSCH resource to report CSI.

The CSI report timing may be based on a total number of PSSCH (e.g., with CSI-RS resource) transmissions for CSI reports and a counter (e.g., a number that is incremented based on the existing number of PSSCH (e.g., with CSI-RS resource) transmissions). For example: in an initial PSSCH transmission, the total number of PSSCH transmissions may include X, and the counter may include 1; in a second PSSCH transmission, the total number of PSSCH transmissions may include X, and the counter may include 2, etc. If the counter reaches the total number X, the Rx WTRU may find a PSSCH resource to report CSI.

A CSI report time window and a CSI report time depending on CSI-RS resources may be jointly used. In examples, if either the CSI report time window or the CSI report time depending on CSI-RS resources are triggered, a CSI report may be transmitted.

Information associated with a CSI-RS resource (e.g., CSI report timing and contents, CSI report type, etc.) may be configured (e.g., between Tx WTRU and Rx WTRU). In examples, a MAC-CE or SCI may include the configuration ID (e.g., to trigger aperiodic CSI reporting).

Semi-Persistent CSI reporting may be provided.

Figure 7:
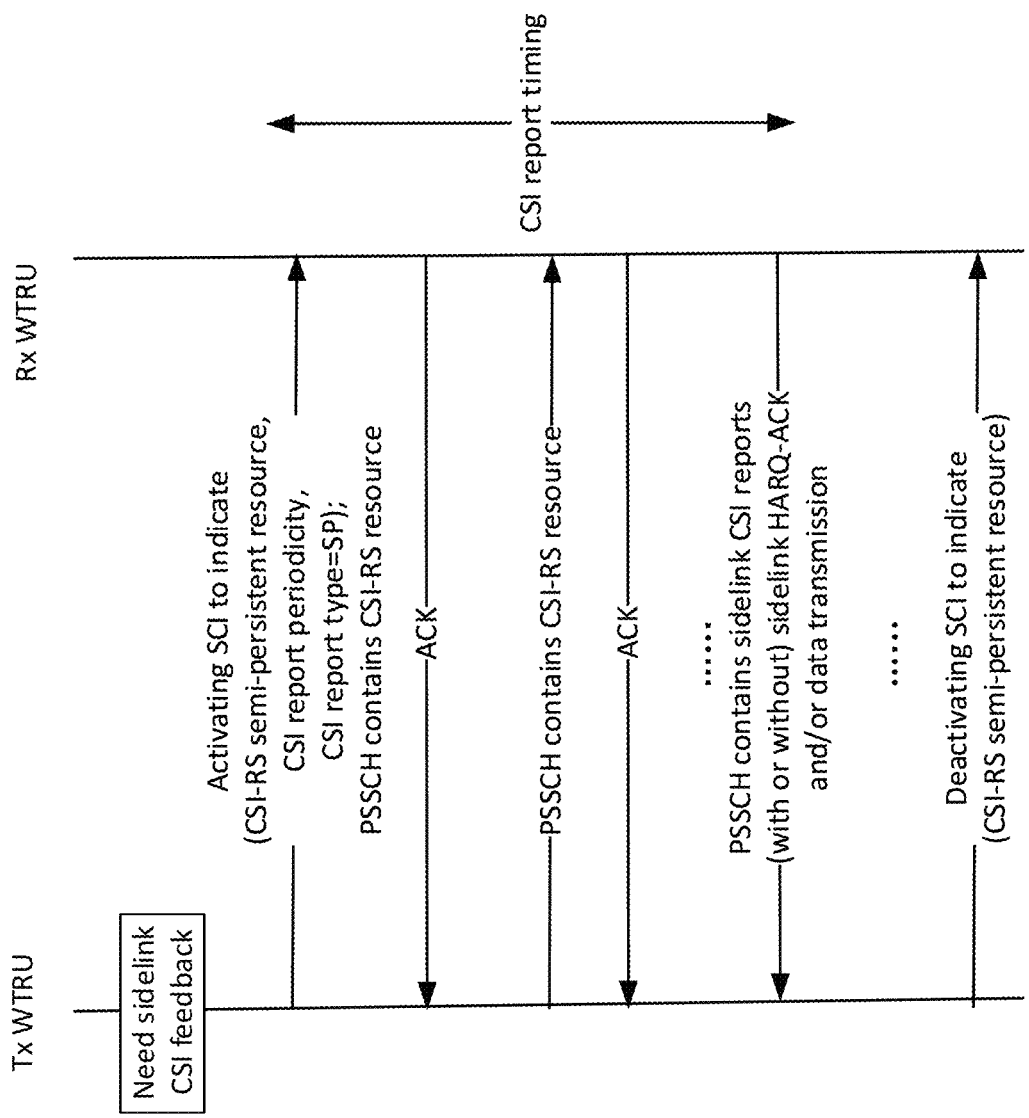
FIG. 7 illustrates example report scheduling.

FIG. 7 shows an exemplary illustration associated with a Tx WTRU scheduling a semi-persistent CSI report. One or more of the following may apply.

A Tx WTRU may send a PSSCH including a sidelink CSI-RS for a Rx WTRU to measure. The SCI to activate CSI reporting may include one or more of the following: the sidelink CSI-RS resource; or the CSI report type, periodicity, and contents.

The SCI to activate CSI reporting may include the sidelink CSI-RS resource. One or more of the following may apply. The frequency (e.g., PRBs) and time (e.g., OFDM symbols) resources for sidelink CSI-RS may be indicated for a Rx WTRU (e.g., to measure the channel). The CSI-RS resource may be semi-persistent or be periodic.

The CSI RS resource periodicity and PSSCH transmission window may be provided. One or more of the following may apply. The periodicity of the CSI RS resource may be provided. PSSCH transmissions with periodic CSI-RS resource may not be guaranteed (e.g., due to the channel congestion or other factors). A window of the PSSCH transmission (e.g., around the scheduled PSSCH transmission (e.g., with periodic or SP CSI-RS resource)) may be provided. If a PSSCH transmission is within the time window of the scheduled PSSCH transmission (e.g., with periodic or SP CSI-RS resource), CSI may be measured. If a PSSCH transmission is outside the window of the scheduled PSSCH, CSI may not be measured.

A CSI RS resource associated with SPS (e.g., or configured grant) configuration of the PSSCH may be provided. One or more of the following may apply. An SP or periodic CSI RS resource may be associated with SPS (e.g., or configured grant) configuration of the PSSCH. The SPS (e.g., or configured grant) configuration of the PSSCH may include the CSI RS. The SCI may indicate the SPS (e.g., or configured grant) configuration based PSSCH that includes a sidelink CSI-RS resource.

The SCI to activate CSI reporting may include the CSI report type, periodicity, and/or contents. One or more of the following may apply. The CSI report type may be semi-persistent, and the CSI report contents may include CQI, RI, PMI, LI, RSRP. The CSI report periodicity may be in terms of number of slots (e.g., starting from the slot of PSSCH to activate the CSI reporting or starting from the slot of sending ACK for the PSSCH to activate the CSI reporting). If the CSI report timing expires, a Rx WTRU may perform the sensing operations (e.g., to find a PSSCH resources to include the sidelink CSI information).

A time window for CSI report may be provided. One or more of the following may apply. A time window may be provided for the CSI report. A Rx WTRU may perform PSSCH resource selection (e.g., within the time window) to report its SP CSI. If the Rx WTRU does not find a PSSCH resource within the time window, the Rx WTRU may not report its SP CSI.

The CSI report timing may depend on the CSI-RS number. One or more of the following may apply. A Tx WRTU may set an SCI field to provide SP CSI report timing (e.g., in terms of the number of PSSCH transmissions including SP or periodic CSI-RS resources). A CSI report time window and a CSI report time that depends on CSI-RS resources may be jointly used. In examples, if the CSI report time window or the CSI report time that depends on CSI-RS are triggered, a CSI report may be sent.

After activating SCI for an SP CSI report, a PSSCH (e.g., a following PSSCH that includes a CSI-RS resource) may not include the certain fields in SCI (e.g. the corresponding fields in SCI).

The activation and deactivation of SP CSI reports may be based on SCI contents. In examples, an SCI field (e.g., a new SCI field) may be used to activate or deactivate an SP CSI report. The SP CSI report may be activated or deactivated if the SCI field of CSI report type is set as SP. In examples, the SP CSI report may be activated if (e.g., the first time that) the SCI field indicates a CSI report type is SP. In examples, the SP CSI report may be deactivated after the second time that the SCI indicates a CSI report type is SP.

Information associated with a CSI-RS resource (e.g., CSI report periodicity, CSI report contents, CSI report type, etc.) may be configured (e.g., between Tx WTRU and Rx WTRU). In examples, a MAC-CE or SCI may include the configuration ID, which may trigger the semi-static CSI reporting.

The calculation of resources for SFCI may be provided

UCI may be transmitted on PUSCH (e.g. in NR). The UCI payload (e.g., including HARQ and CSI) may be RM/polar coded, rate matched, and mapped on a PUSCH resources. The number of coded modulation symbols for HARQ and/or CSI may be determined via one or more parameters (e.g., parameters $\beta_{offset}^{HARQ-ACK}$, $\beta_{offset}^{CSI-part1}$ and $\beta_{offset}^{CSI-part2}$), which may be configured in a layer (e.g., high layer) IE (e.g., "UCI-OnPUSCH"). One or more (e.g., up to 4 sets of) beta_offsets may be configured, and the DCI format 0_1 may indicate which set is used.

In V2X (e.g., NR V2X), the SFCI may be transmitted on PSSCH. The SFCI may be encoded by a RM/polar code, and PSSCH data may be encoded by an LDPC code. The bits (e.g., the rate matched bits) for SFCI may be mapped to the PSSCH resource (e.g., the front of the PSSCH resource). The bits (e.g., the rate matched bits) for sidelink data may be mapped to the PSSCH resource (e.g., to the back of the PSSCH resource). The HARQ bits may be placed before SCI bits (e.g., among the SFCI). A parameter (e.g., a single parameter, say $\beta_{offset}^{SCSI}$) may be used for sidelink CSI (e.g., if there is only a single part CSI for NR V2X). A parameter (e.g. $\beta\beta_{offset}^{SHARQ-ACK}$) may be used for sidelink HARQ-ACK.

For sidelink HARQ-ACK transmission on a PSSCH with SL data, the number of resource elements per layer for HARQ-ACK transmission may include:

$$Q_{ACK} = \min\left\{\frac{P_{ACK} \cdot RE_{PSSCH} \cdot \beta_{offset}^{SHARQ-ACK}}{P_{data}}, RE_{PSSCH}\right\}$$

One or more of the following may apply: $P_{ACK}$ may indicate the payload of sidelink ACK (e.g., including CRC); $P_{data}$ may indicate the payload of sidelink data; or $RE_{PSSCH}$ may indicate the total resource elements for PSSCH. The remaining resource elements of PSSCH may be used for data transmission.

For sidelink HARQ-ACK transmission on PSSCH without SL data, the number of resource element per layer for HARQ-ACK transmission may include:

$$Q_{ACK} = \min\left\{\frac{P_{ACK} \cdot RE_{PSSCH} \cdot \beta_{offset}^{SHARQ-ACK}}{P_{CSI} \cdot \beta_{offset}^{SCSI}}, RE_{PSSCH}\right\}$$

One or more of the following may apply. $P_{CSI}$ may indicate the payload of sidelink CSI. The remaining resource elements of the PSSCH may be used for sidelink CSI transmission.

For sidelink CSI transmission on PSSCH, the number of resource element(s) per layer for CSI transmission may include:

$$Q_{CSI} = \min\left\{\frac{P_{CSI} \cdot RE_{PSSCH} \cdot \beta_{offset}^{SCSI}}{P_{data}}, RE_{PSSCH} - Q_{ACK}\right\}$$

One or more of the following may apply. $P_{CSI}$ may indicate the payload of sidelink CSI (e.g., including CRC). $Q_{ACK}$ may indicate the resource element allocated for sidelink HARQ-ACK.

Signaling of a beta offset may be provided.

A device (e.g., a gNB) may configure one or more (e.g., 4) sets of beta_offsets (e.g., where each set may include a beta_offset for sidelink HARQ-ACK and a beta_offset for sidelink CSI). A beta_offset of sidelink HARQ-ACK may include one or more parameters, for example, depending on the HARQ-ACK feedback payload sizes (e.g., smaller than 2 bits, between 2 and 11 bits, and larger than 11 bits). A beta_offset of sidelink CSI may include one or more parameters, for example, depending on CSI feedback payload sizes (e.g., smaller than or equal to 11 bits, and larger than 11 bits).

A configuration (e.g., a common configuration) may be used by one or more WTRUs (e.g., all the WTRUs). For example, a SIB message may include the configuration of the beta_offset. The beta_offset configuration may be associated with a resource pool configuration. The resource pool configuration may include a set of beta_offsets (e.g., for HARQ-ACK and CSI).

A Tx WTRU may activate SFCI piggyback on PSSCH and determine a beta-offset. One or more of the following may apply. A Tx WTRU may determine to activate the SFCI piggyback on PSSCH and may select a set of beta-offsets. The selection result may be indicated in SCI. In examples, the SCI may include a field to indicate which set of beta_offsets is to be used. The field may include 2 bits (e.g., if a total of 4 sets of beta_offsets are configured). The field may include 3 bits (e.g., if a total of 8 sets of beta_offsets are configured). The field may include 1 bit (e.g., if a total of 2 sets of beta_offsets are configured). This beta_offset field may act as an activation of SFCI feedback. The activation may (e.g., by default) indicate that the SFCI feedback be piggybacked on a PSSCH transmission (e.g., the next PSSCH transmission from the Rx WTRU). The activation may (e.g., by default) indicate the timing of the PSSCH transmission (e.g., the $X^{th}$ next PSSCH transmission from the Rx WTRU).

A device (e.g., gNB) or resource pool may configure a single set of beta_offset. If a single set of beta_offset is configured, a field in SCI may not be used (e.g., a specific field in SCI may not be needed) to indicate the beta_offset and the SCI may include a bit to activate the SFCI feedback.

Figure 8:
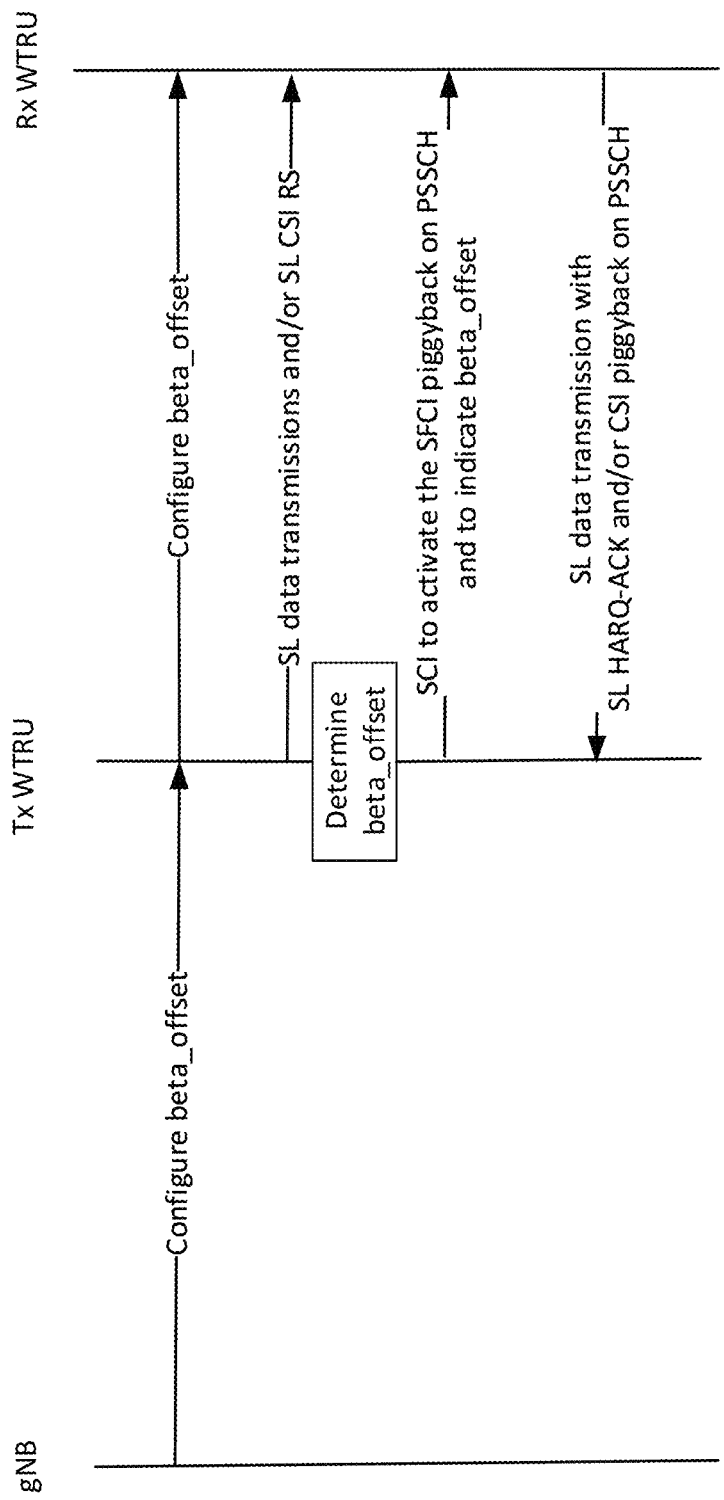
FIG. 8 illustrates example activating of SFCI piggyback on PSSCH.

FIG. 8 shows an example flow associated with a Tx WTRU that may activate SFCI piggyback on PSSCH and may determine beta_offset. One or more of the following may apply. A device (e.g., a gNB) may configure a set of beta_offsets (e.g., in a common RRC message, which may be associated with resource pool configuration). A Tx WTRU may have made one or more (e.g., several) sidelink data transmissions and may send sidelink reference signals for CSI estimation. The Tx WTRU may determine to activate the CSI feedback and/or HARQ-ACK feedback. The Tx WTRU may select a set of beta_offsets. The WTRU may indicate the beta_offset in SCI. The SCI may be sent, for example, with or without sidelink data. The beta_offset in SCI may (e.g., by default) serve as the activation of the SFCI piggyback on PSSCH. The timing of the SFCI piggyback on PSSCH may be indicated in SCI, or may (e.g., by default) be set as the next sidelink data transmission from a Rx WTRU. If the Rx WTRU receives the SCI with beta_offset, the Rx WTRU may piggyback the SFCI transmissions on a PSSCH (e.g., based on the indicated beta_offset and PSSCH timing). The SCI may indicate the used beta_offset (e.g., for PSSCH transmissions associated with the Rx WTRU).

A Tx WTRU may activate SFCI piggyback on PSSCH and a Rx WTRU may determine the beta-offset. One or more of the following may apply.

A Tx WTRU may activate an SFCI transmission (e.g., piggyback on PSSCH). The Tx WTRU may not determine/indicate the beta_offset. The selection of a set of beta-offset may be made by a Rx WTRU, and may be included in the SCI (e.g., as a part of the data transmissions from the Rx WTRU). The selection of the beta_offset may depend on data payload, data QoS, etc. The Rx WTRU may determine (e.g., flexibly determine) the resources for SFCI and data transmissions.

Figure 9:
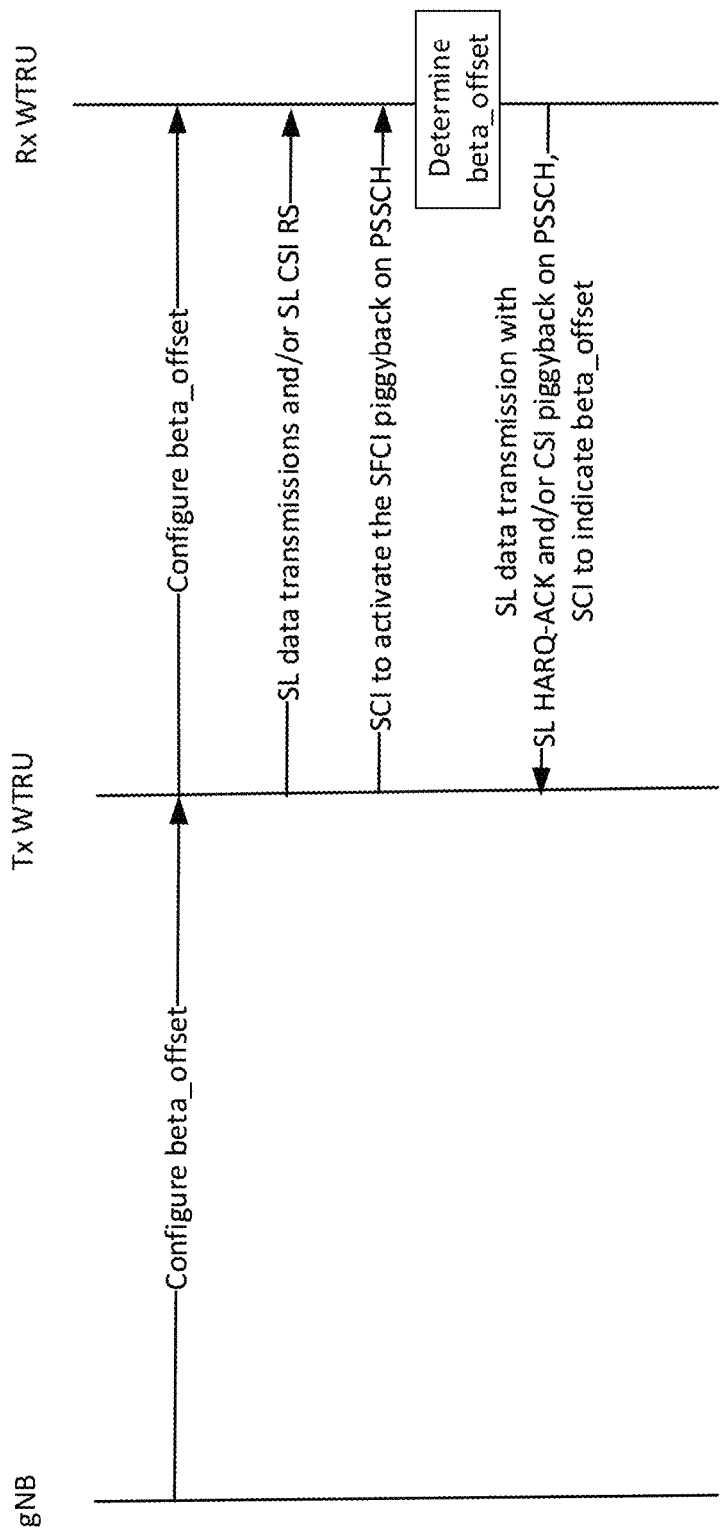
FIG. 9 illustrates example activating of SFCI piggyback on PSSCH.

FIG. 9 shows an example flow associated with a Tx WTRU that may activate SFCI piggyback on PSSCH and a Rx WTRU that may determine the beta_offset. A device (e.g., gNB) may configure a set of beta_offsets (e.g., in a RRC message, which may be associated with resource pool configuration). A Tx WTRU may have made one or more (e.g., several) sidelink data transmissions and may send sidelink reference signals for CSI estimation. The Tx WTRU may determine (e.g. decide) to activate the CSI feedback and/or HARQ-ACK feedback. The Tx WTRU may indicate the activation of CSI feedback and/or HARQ-ACK feedback (e.g., in a bit in SCI). The activation timing may be indicated in SCI, or may be (e.g., by default) set as the next sidelink data transmission from a Rx WTRU. After receiving the activation SCI, the Rx WTRU may compare the payload size of SFCI and the payload size of sidelink data, the data QoS, etc. the Rx WTRU may determine the beta_offset. The Rx WTRU may map the rate matched bits to the corresponding resource elements for SFCI (e.g., based on the determined beta_offset for sidelink CSI and sidelink HARQ-ACK). In the data transmissions, for example, the Rx WTRU may indicate the beta_offset selection results (e.g., in SCI).

A Rx WTRU may activate SFCI piggyback on PSSCH and may determine the beta-offset. One or more of the following may apply.

A Rx WTRU may activate an SFCI transmission (e.g., piggyback on PSSCH), and may determine/indicate the beta_offset. A trigger of the SFCI piggyback on PSSCH may depend on the SFCI payload size. In examples, if the accumulated sidelink CSI feedback payload size reaches a certain threshold, the SFCI piggyback on PSSCH may be triggered. In examples, if the number of HARQ-ACK bits reaches a certain threshold, the SFCI piggyback on PSSCH may be triggered. In examples, if the combined accumulated sidelink CSI and HARQ-ACK bits payload size reaches a certain threshold, the SFCI piggyback on PSSCH may be triggered.

The selection of a set of beta-offsets may be included in the SCI (e.g., as a part of the data transmissions from a Rx WTRU). The selection of the beta_offset may depend on the data payload, data QoS, etc.

Figure 10:
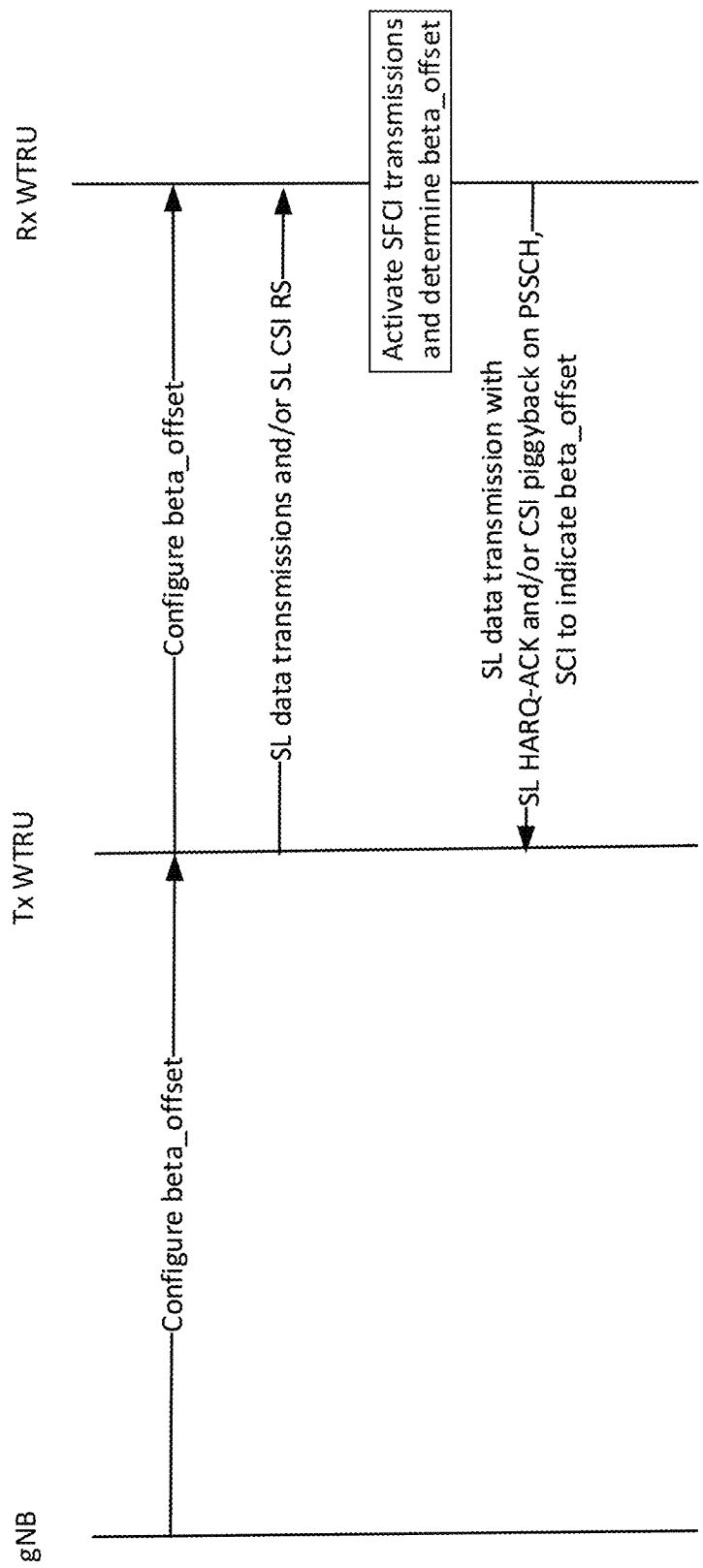
FIG. 10 illustrates example activating of SFCI piggyback on PSSCH.

FIG. 10 shows an example flow associated with a Rx WTRU that activates SFCI piggyback on PSSCH and determines a beta_offset. One or more of the following may apply. A device (e.g., gNB) may configure a set of beta_offsets (e.g., in a RRC message, which may be associated with resource pool configuration). A Tx WTRU may have performed one or more (e.g., several) sidelink data transmissions and may send sidelink reference signals for CSI estimation. A Rx WTRU may determine to activate the CSI feedback and/or HARQ-ACK feedback, for example, based on a certain threshold of the SFCI payload or data QoS. The Rx WTRU may compare the payload size of SFCI and the payload size of the sidelink data, the data QoS, etc. The Rx WTRU may determine the beta_offset. The Rx WTRU may map the rate matched bits to the corresponding resource elements for SFCI (e.g., based on the determined beta_offset for sidelink CSI and sidelink HARQ-ACK). In the data transmissions, the Rx WTRU may indicate the beta_offset selection results (e.g., in SCI).

Resource allocation for Mode 1 WTRU retransmissions may be provided. A Tx WTRU may request transmission resources. A Rx WTRU may report to a gNB for retransmission (e.g., in sidelink groupcast).

A Tx WTRU may request retransmission resources. One or more of the following may apply.

A Tx WTRU (e.g., a mode 1 WTRU) may determine to perform (e.g., may want to perform) a unicast transmission to a Rx WTRU. The Tx WTRU may send a scheduling request to a device (e.g., a gNB) for sidelink transmission resources. The Tx WTRU may send (e.g., may also send) a sidelink buffer status report to the device (e.g., gNB). The buffer status report may include one or more of the following: the destination ID; logic channel group (LCG) ID; buffer size corresponding to the LCG; an indication of whether the SL transmission is unicast, groupcast or broadcast; or an indication of whether HARQ feedback is required by a Rx WTRU. Depending on the scheduling request from the Tx WTRU, the device (e.g., gNB) may assign sidelink resources to the Tx WTRU. The device (e.g., gNB) may include an indication of the PSFCH resource (e.g., if the HARQ feedback is required).

The Tx WTRU may send its data to the Rx WTRU on the assigned resources (e.g., the gNB assigned resources for SL transmissions). The Rx WTRU may not decode the PSSCH data. The Rx WTRU may follow the SCI indication, e.g., to send a NACK bit to the Tx WTRU.

If the Tx WTRU receives the NACK bit from the Rx WTRU, the Tx WTRU may determine (e.g., decide) whether to perform a retransmission, which may depend on the data QoS. In examples, if the data latency requirements may be reached for a retransmission, the Tx WTRU may ignore the retransmission.

A Tx WTRU may communicate with a gNB (e.g., if the Tx WTRU determines (e.g., decides) to make a retransmission). One or more of the following may apply.

A Tx WTRU may send a scheduling request (e.g., another scheduling request to the gNB). The Tx WTRU may send information for the retransmissions (e.g., instead of sending a new buffer status report (BSR)). The information may include one or more of the following: a destination ID; updated data QoS (e.g., updated data latency requirement), the LCG corresponding to the updated data QoS, the backward time offset to a previous sidelink data transmission of the same data. The destination ID may be used to indicate which sidelink session a NACK is associated with. The sidelink HARQ feedback timing may be flexible. In examples, the NACK feedback from a Tx WTRU to gNB may have a flexible timing. A Tx WTRU may report to a gNB (e.g., a gNB that previously scheduled a resource that incurs the NACK feedback). The backward time offset (e.g., or another timing related indication) may help the gNB to obtain the information about the size of resources for the retransmission.

A Tx WTRU may send a NACK bit (e.g., via PUCCH), and may indicate that the NACK information is associate with a sidelink transmission (e.g., a certain sidelink transmission). In examples, a sequence (e.g., a gold sequence with a specific cyclic shift and/or OCC sequence) may be used to indicate the NACK on SL transmissions. In examples, a RNTI (e.g., destination ID) may be used to scramble the PUCCH (e.g., PUCCH format 2).

Figure 11:
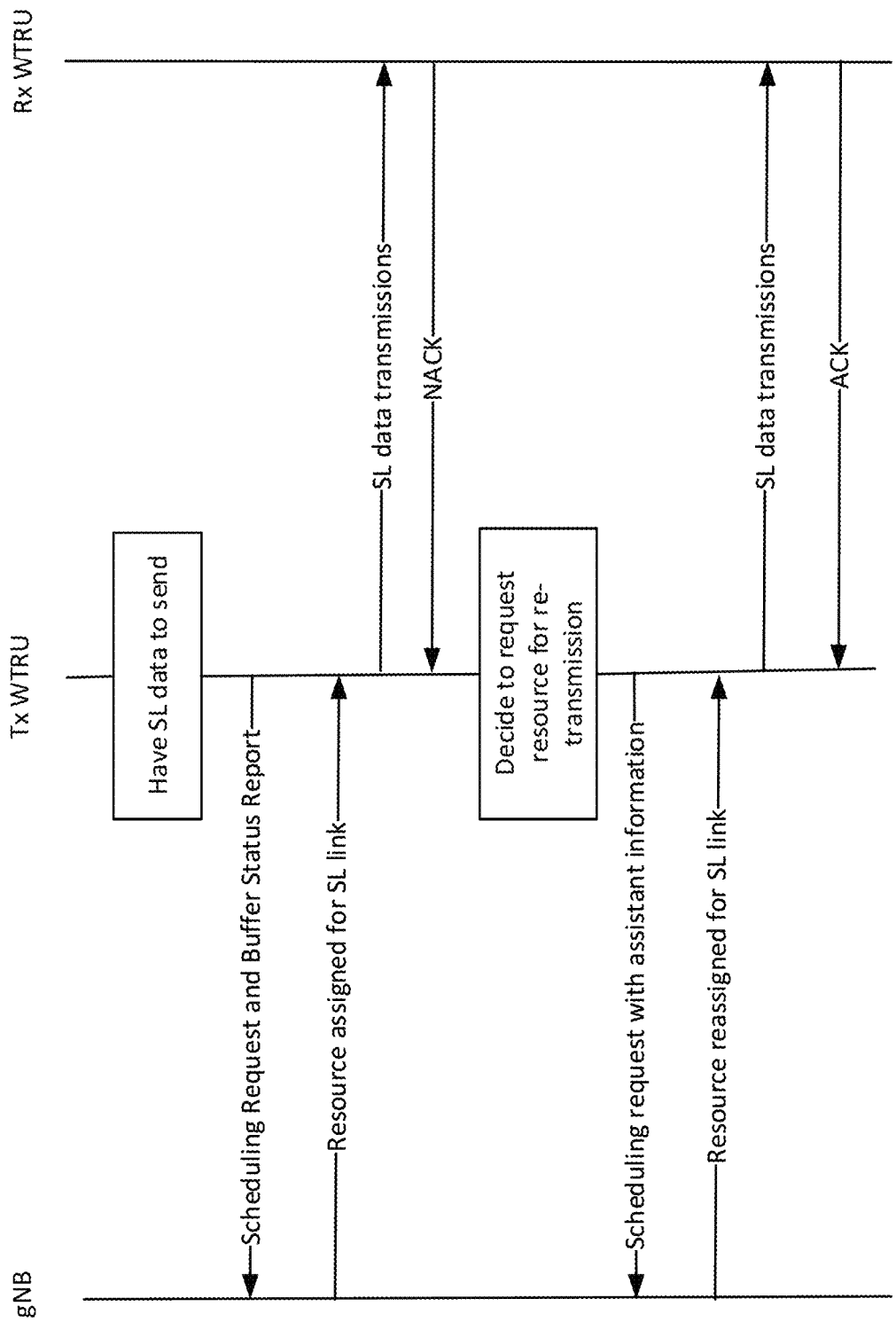
FIG. 11 illustrates example sidelink communications.

If the gNB receives the scheduling request (SR) for sidelink retransmission, the gNB may assign the proper resources for the sidelink retransmission. The Tx WTRU may perform the retransmission operations (e.g., after it receives the new resources). FIG. 11 shows an example flow associated with a WTRU's (e.g., a mode 1 WTRU's) sidelink retransmission.

Rx WTRU reporting to gNB for retransmission in sidelink groupcast may be provided.

A Tx WTRU (e.g., a mode 1 WTRU) may perform (e.g., may want to perform) a groupcast transmission to other WTRUs. The Tx WTRU may send a scheduling request to a device (e.g., gNB) for sidelink transmission resources. The Tx WTRU may send (e.g., may also send) a sidelink buffer status report to the device (e.g., gNB). The buffer status report may include one or more of the following: the destination ID; LCG ID; the buffer size corresponding to the LCG; an indication of whether the SL transmission is unicast, groupcast or broadcast; or an indication of whether HARQ feedback is required by a Rx WTRU. Depending on the scheduling request from the Tx WTRU, the device (e.g., gNB) may assign the sidelink resources to the Tx WTRU.

The Tx WTRU may send its data to a Rx WTRU (e.g., on the gNB assigned resources for SL transmissions). The Rx WTRU may or may not decode the PSSCH data. Following the HARQ-NACK scheme, one or more of the following may apply. The Rx WTRU may successfully decode PSSCH data and the Rx WTRU may not send anything to the gNB. The Rx WTRU may not decode the PSSCH data, and the Rx WTRU may send one or more NACK bits to gNB (e.g., via PUCCH) and an indication that this NACK information is for sidelink transmissions. In examples, a sequence (e.g., a gold sequence with a specific cyclic shift or OCC sequence) may be used to indicate that a NACK is for SL transmissions. In examples, a RNTI (e.g., source ID) may be used to scramble the PUCCH (e.g., PUCCH format 2).

The Rx WTRU may inform (e.g., in addition to the NACK bits) the gNB of: the Tx WTRU ID and/or the backward time offset to the previous sidelink data transmission of the same data. The backward time offset may help gNB to obtain the information about the size of resources for the retransmission.

If the gNB receives the NACK bit from one or more Rx WTRUs, the gNB may determine (e.g., decide) whether to perform a retransmission, which may depend on the data QoS requirements. In examples, if the data latency requirements could be reached for a retransmission, the gNB may ignore the retransmission.

If the gNB determines (e.g., decides) the resource(s) for sidelink retransmissions, the gNB may inform the Tx WTRU of the assigned resource(s). The gNB may indicate (e.g., may also indicate) that the assigned resource(s) are for sidelink retransmission, which may be based on the destination ID, LCG ID, HARQ process ID, etc., or the like.

Figure 12:
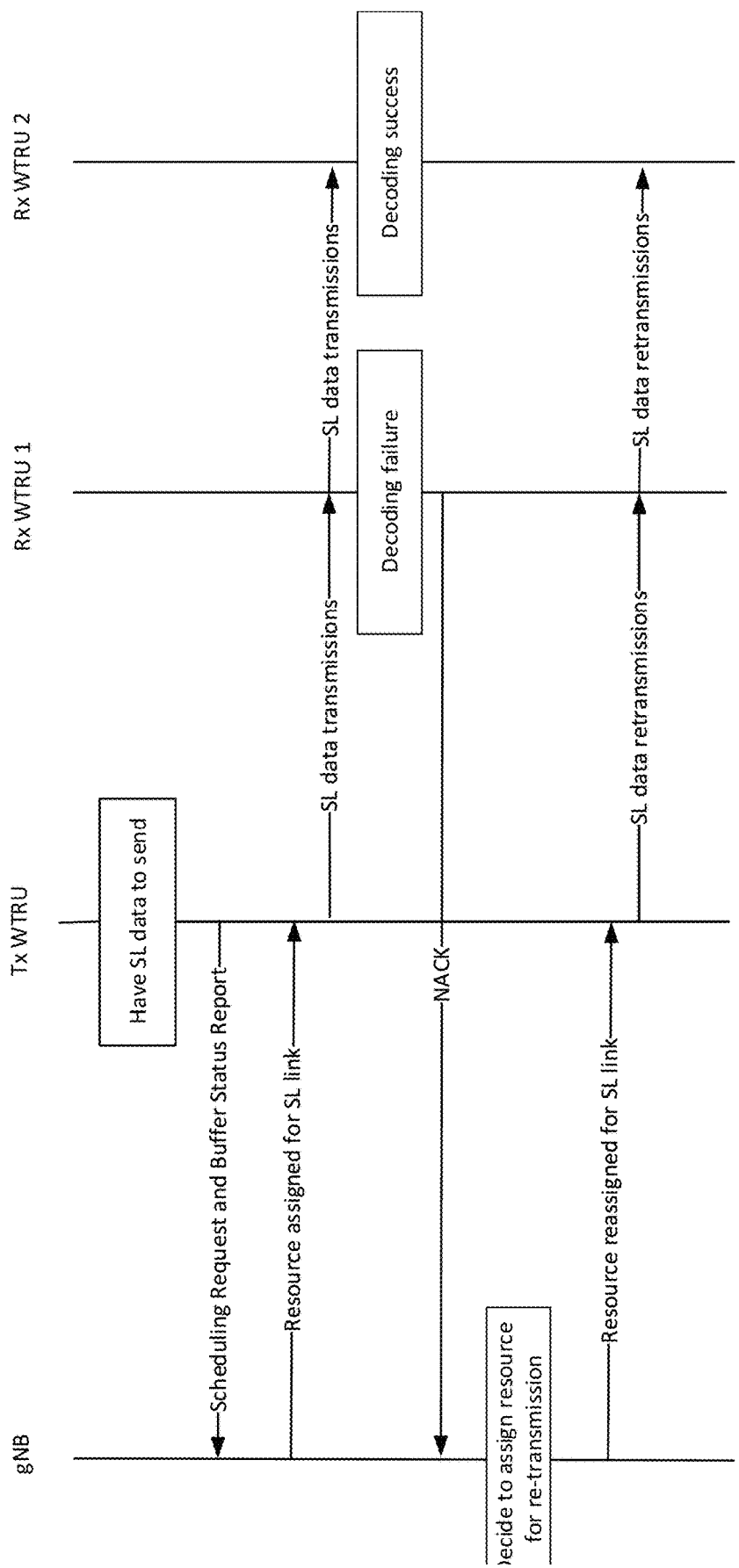
FIG. 12 illustrates example sidelink communications.

The Tx WTRU may perform the retransmission operations (e.g., after it receives the new resources). FIG. 12 shows an example associated with WTRU (e.g., mode 1 WTRU) sidelink retransmission.

Compact DCI 5A for gNB to schedule LTE sidelink may be provided. The number of subchannels may be restricted.

Compact DCI may be performed (e.g., in NR URLLC or eURLLC). Compact DCI may reduce the number of DCI format 0_0 bits (e.g., from 40 bits to about 24 bits to support URLLC services).

In V2X (e.g., NR V2X), a gNB may transmit to a WTRU (e.g., to schedule the LTE sidelink transmissions) using a NR DCI format. In examples, DCI format 5A may be re-used (e.g., in LTE V2X). The payload of DCI format 5A may be matched to DCI format 0, for example, in the payload size to reduce the blind detection (e.g., in LTE).

The payload of the DCI format (e.g., which may be used for a gNB to schedule LTE V2X sidelink) may match the size of compact DCI (e.g., in NR URLLC services). Blind detection of NR WTRUs with V2X capabilities may be reduced. DCI format 5A (e.g., LTE DCI format 5A) may include a maximum possible payload larger than 24 bits. DCI format 5A may be restricted to a payload size of 24 bits.

One or more of the following may apply (e.g., in LTE DCI format 5A). A carrier indicator field may include 3 bits and a maximum number of subchannels may include 20. A "lowest index of the subchannel allocation to the initial transmission" field may include one or more (e.g., up to 5) bits. A "frequency resource location of initial transmission and retransmission" field may include one or more (e.g., up to 8) bits. A "time gap between initial transmission and retransmission" field may include one or more (e.g., 4 bits). A "SL index" field may include one or more (e.g., 2) bits. A SL SPS configuration index may include one or more (e.g., 3) bits. An "activation/release indication" may include one or more (e.g., 1) bit. A payload size (e.g., a total maximum payload size without zero-padding) may include 26 bits, which may be larger than the compact DCI size (e.g., an expected compact DCI size for URLLC or eURLLC).

A compact DCI format 5A may restrict the configuration of the maximum number (e.g., 20) of subchannels of a resource pool (e.g., for LTE V2X transmissions or in case a gNB is to schedule the LTE V2X transmissions). The possible numbers of subchannels of a resource pool may include {1, 3, 5, 8, 10, 15, 20} (e.g., according to an LTE V2X resource pool configuration). If the usage of a resource pool is restricted to a maximum 15 subchannels, one or more of the following may apply. A "Lowest index of the subchannel allocation to the initial transmission" field in DCI format 5A may include 4 bits. A "frequency resource location of initial transmission and retransmission" field in DCI format 5A may include 7 bits. The DCI format 5A payload may include 24 bits. Zero padding may not be used (e.g., to match the compact DCI size in URLLC). The SL-V-RNTI or SL-SPS-V-RNTI may be used to mask one or more (e.g., the last 16 bits) CRC bits, for example, to distinguish compact DCI format 5A from the compact DCI format of other URLLC services.

A gNB may perform one or more of the following. If a resource pool (e.g., of LTE V2X) is configured with 20 subchannels, the gNB may stop scheduling a WTRU's transmissions (e.g., LTE V2X transmissions). If the resource pool (e.g., of LTE V2X) is configured with no more than 20 subchannels, the gNB may schedule a WTRU's transmission (e.g., LTE V2X transmissions).

Accordingly, techniques have been described for selecting feedback formats to be used with sidelink communications. A WTRU may select sidelink unicast transmission or sidelink groupcast transmission to transmit data. If the WTRU selects sidelink unicast to transmit the data, the WTRU may select HARQ ACK/NACK feedback to be used for feedback associated with transmission of the data. If the WTRU selects sidelink groupcast transmission to transmit the data, either HARQ NACK feedback or HARQ ACK/NACK feedback may be selected for feedback depending upon one or more factors or conditions. The WTRU may select HARQ NACK feedback or HARQ ACK/NACK feedback for use with transmission of the data depending upon one or more of: a number of WTRUs to receive the data; a condition of a channel associated with transmitting the data; or a quality of service associated with transmitting the data. The WTRU may select a first PSFCH format or a second PSFCH format for providing feedback in connection with transmitting the data based upon one or more factors or conditions. The WTRU may select a first PSFCH format or a second PSFCH format based upon one or more of: the selected sidelink unicast or sidelink groupcast; the selected HARQ NACK feedback or HARQ ACK/NACK feedback; or a quality of service associated with transmitting the data.

It will be appreciated that while illustrative implementations have been disclosed, the scope of potential implementations is not limited to those explicitly set out. For example, while systems have been described with reference to a particular criteria or conditions, the envisioned implementations extend beyond implementations using the particular criteria or conditions. Although the features and elements may be described herein in particular combinations, each feature or element may be used alone, without the other features and elements, and/or in various combinations with or without other features and elements.

It is understood that the entities performing the processes described herein may be logical entities that may be implemented in the form of software (i.e., computer-executable instructions) stored in a memory of, and executing on a processor of, a mobile device, network node or computer system. That is, the operation(s) may be implemented in the form of software (i.e., computer-executable instructions) stored in a memory of a mobile device and/or network node, such as the node or computer system, which computer executable instructions, when executed by a processor of the node, perform the processes discussed. It is also understood that any transmitting and receiving processes illustrated in FIGS. may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (i.e., instructions) embodied in tangible media, such as flash drives, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs may be implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing illustrative implementations of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. Details described herein are intended to be exemplary and in no way limit the scope of the application.

Although features and elements are described herein in particular combinations, one of ordinary skill in the art will appreciate that each feature or element can be used alone or in any combination with the other features and elements. In addition, the implementations described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method, implemented in a first wireless transmit and receive unit (WTRU), comprising:
  transmitting, to a network node, a first message comprising first information indicating a scheduling request for sidelink transmission resources;
  receiving, from the network node, a second message comprising second information indicating the sidelink transmission resources based on the first message;
  transmitting, to a second WTRU, sidelink data, using the indicated sidelink transmission resources;
  receiving, from the network node, a third message comprising third information indicating sidelink retransmission resources for transmitting the sidelink data; and
  transmitting, to the second WTRU, the sidelink data using the indicated sidelink retransmission resources.

2. The method of claim 1, wherein the first message comprises fourth information indicating an identifier of the second WTRU, sidelink transmission type among unicast, groupcast, and broadcast, and whether hybrid automatic repeat request (HARQ) feedback is required by the second WTRU.

3. A method, implemented in a network node, comprising:
  receiving, from a first WTRU, a first message comprising first information indicating a scheduling request for sidelink transmission resources for sidelink data transmission to at least one second WTRU;
  transmitting, to the first WTRU, a second message comprising second information indicating the sidelink transmission resources based on the first message for the sidelink data transmission to the second WTRU;
  receiving from the second WTRU, a third message comprising third information indicating a negative acknowledgment (NACK) corresponding to the sidelink data transmission;
  determining retransmission resources for the sidelink data transmission; and transmitting, to the first WTRU, a fourth message comprising fourth information indicating sidelink retransmission resources for the sidelink data transmission to the second WTRU.

4. The method of claim 3, wherein the first message comprises fifth information indicating an identifier of the second WTRU, sidelink transmission type among unicast, groupcast, and broadcast, and whether HARQ feedback is required by the second WTRU.

5. The method of claim 3, wherein the third message is sent via a physical uplink control channel (PUCCH).

6. The method of claim 5, wherein the PUCCH is scrambled by a radio network temporary identifier (RNTI).

7. The method of claim 3, wherein the third message comprises an identifier of the first WTRU and backward time offset to previous sidelink data transmission of the same data.

8. The method of claim 3, wherein determining the retransmission resources is based on the quality of signal.

9. The method of claim 3, wherein the fourth message comprises sixth information indicating an identifier of the second WTRU and a HARQ process identifier.

10. A first WTRU, comprising a processor, a transceiver unit, and a storage unit, and configured to:
    transmit, to a network node, a first message comprising first information indicating a scheduling request for sidelink transmission resources;
    receive, from the network node, a second message comprising second information indicating the sidelink transmission resources based on the first message;
    transmit, to a second WTRU, sidelink data, using the indicated sidelink transmission resources;
    receive, from the network node, a third message comprising third information indicating sidelink retransmission resources for transmitting the sidelink data; and
    transmit, to the second WTRU, the sidelink data using the indicated sidelink retransmission resources.

11. The WTRU of claim 10, wherein the first message comprises fourth information indicating an identifier of the second WTRU, sidelink transmission type among unicast, groupcast, and broadcast, and whether HARQ feedback is required by the second WTRU.

12. A network node, comprising a processor, a transceiver unit, and a storage unit, and configured to:
    receive, from a first WTRU, a first message comprising first information indicating a scheduling request for sidelink transmission resources for sidelink data transmission to at least one second WTRU;
    transmit, to the first WTRU, a second message comprising second information indicating the sidelink transmission resources based on the first message for the sidelink data transmission to the second WTRU;
    receive from the second WTRU, a third message comprising third information indicating a NACK corresponding to the sidelink data transmission;
    determine retransmission resources for the sidelink data transmission; and
    transmit, to the first WTRU, a fourth message comprising fourth information indicating sidelink retransmission resources for the sidelink data transmission to the second WTRU.

13. The network node of claim 12, wherein the first message comprises fifth information indicating an identifier of the second WTRU, sidelink transmission type among unicast, groupcast, and broadcast, and whether HARQ feedback is required by the second WTRU.

14. The network node of claim 12, wherein the third message is sent via a PUCCH.

15. The network node of claim 14, wherein the PUCCH is scrambled by a RNTI.

16. The network node of claim 12, wherein the third message comprises an identifier of the first WTRU and backward time offset to previous sidelink data transmission of the same data.

17. The network node of claim 12, wherein determining the retransmission resources is based on the quality of signal.

18. The network node of claim 12, wherein the fourth message comprises sixth information indicating an identifier of the second WTRU and a HARQ process identifier.

* * * * *